(12) United States Patent
Tsuchida et al.

(10) Patent No.: US 9,892,187 B2
(45) Date of Patent: Feb. 13, 2018

(54) DATA ANALYSIS METHOD, DATA ANALYSIS DEVICE, AND STORAGE MEDIUM STORING PROCESSING PROGRAM FOR SAME

(75) Inventors: Masashi Tsuchida, Tokyo (JP); Takashi Kotera, Tokyo (JP); Shohei Matsuura, Tokyo (JP); Yukio Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 445 days.

(21) Appl. No.: 14/402,838

(22) PCT Filed: Sep. 14, 2012

(86) PCT No.: PCT/JP2012/073734
§ 371 (c)(1),
(2), (4) Date: Nov. 21, 2014

(87) PCT Pub. No.: WO2014/041699
PCT Pub. Date: Mar. 20, 2014

(65) Prior Publication Data
US 2015/0100543 A1   Apr. 9, 2015

(51) Int. Cl.
*G06F 17/30* (2006.01)

(52) U.S. Cl.
CPC .............. *G06F 17/30592* (2013.01)

(58) Field of Classification Search
USPC ................................. 707/603, 798
See application file for complete search history.

(56) References Cited

U.S. PATENT DOCUMENTS 6,115,712 A    9/2000  Islam et al.
6,377,943 B1 *  4/2002  Jakobsson ......... G06F 17/30466
6,976,015 B2 * 12/2005  Kumar ............. G06F 17/30448
                                                    707/714
(Continued)

FOREIGN PATENT DOCUMENTS

JP    10-116190 A    5/1998
JP    2006-513462 A  4/2006
(Continued)

OTHER PUBLICATIONS

Shimizu, "Creating data warehouses based on multidimensional models", Provision, Oct. 29, 2001, pp. 74-83, vol. 8, No. 4.

*Primary Examiner* — Kim Nguyen
(74) *Attorney, Agent, or Firm* — Mattingly & Malur, PC

(57) ABSTRACT

A data analysis method for analyzing data on a data analysis apparatus having: setting, a plurality of dimension tables each having a first identifier for identifying data to be analyzed and attributes corresponding to the first identifier; setting, a history table having a second identifier associated with each of the first identifiers of the dimension tables, and having attributes corresponding to the second identifier; setting, a relation table for storing attributes relating to the first identifier, the dimension tables having a first dimension table associated with the relation table through the attribute relating to the first identifier; associating, the first identifiers that refers to the first identifier of a first dimension table with the attributes; and processing, a query for the relation table and the first dimension table, and generating a second dimension table.

20 Claims, 22 Drawing Sheets

(56) References Cited

U.S. PATENT DOCUMENTS

| | | | | |
|---|---|---|---|---|
| 7,287,022 B2* | 10/2007 | Netz | ................ | G06F 17/30592 |
| | | | | 707/600 |
| 7,653,594 B2 | 1/2010 | Davis | | |
| 7,949,628 B1* | 5/2011 | Blazek | .................... | G06F 8/70 |
| | | | | 707/600 |
| 8,112,387 B2* | 2/2012 | Dampier | ........... | G06F 17/30551 |
| | | | | 707/603 |
| 8,165,989 B2* | 4/2012 | Dettinger | ......... | G06F 17/30864 |
| | | | | 707/603 |
| 8,170,984 B2* | 5/2012 | Bakalash | ......... | G06F 17/30457 |
| | | | | 707/603 |
| 8,219,520 B2* | 7/2012 | Li | .................... | G06F 17/30592 |
| | | | | 707/602 |
| 8,543,566 B2* | 9/2013 | Weissman | ........ | G06F 17/30442 |
| | | | | 707/713 |
| 8,655,918 B2* | 2/2014 | Chitnis | ............... | G06Q 10/087 |
| | | | | 705/7.12 |
| 8,892,525 B2* | 11/2014 | Gorelik | ............ | G06F 17/30371 |
| | | | | 707/687 |
| 9,218,409 B2* | 12/2015 | Weinberg | ......... | G06F 17/30595 |
| 2004/0139061 A1 | 7/2004 | Colossi et al. | | |
| 2007/0027904 A1 | 2/2007 | Chow et al. | | |
| 2010/0318492 A1 | 12/2010 | Utsugi | | |

FOREIGN PATENT DOCUMENTS

| | | |
|---|---|---|
| JP | 2006-513474 A | 4/2006 |
| JP | 2008-544382 A | 12/2008 |
| JP | 2011-002911 A | 1/2011 |

* cited by examiner

GRAPH EXPRESSION BASED ON GRAPH STRUCTURE

⎯ 520

```
CREATE TABLE PRODUCT DIMENSION TABLE
(PRODUCT id        char (8)     primary key,
 PRODUCT NAME      char (40) )
CREATE TABLE CUSTOMER DIMENSION TABLE
(CUSTOMER id       char (8)     primary key,
 CUSTOMER NAME     char (40) )
CREATE TABLE AREA DIMENSION TABLE
(AREA cd           char (8)     primary key,
 AREA NAME         char (40) )
CREATE TABLE PERIOD DIMENSION TABLE
(PERIOD cd         char (8)     primary key,
 PERIOD NAME       char (40) )
CREATE TABLE CUSTOMER SALES HISTORY TABLE
(PRODUCT id        char (8)     references PRODUCT DIMENSION TABLE,
 CUSTOMER id       char (8)     references CUSTOMER DIMENSION TABLE,
 AREA cd           char (8)     references AREA DIMENSION TABLE,
 PERIOD cd         char (8)     references PERIOD DIMENSION TABLE,
 SELLING PRICE     integer,
 QUANTITY          integer,
                   primary key (PRODUCT id, CUSTOMER id, AREA cd, PERIOD cd))
```

Fig. 5B

```
                    ┌─ 530
                    ╱
┌─────────────────────────────────────────────────────────────────────┐
│ CREATE TABLE CUSTOMER DIMENSION TABLE                           │
│ (CUSTOMER id         char (8)        primary key,               │
│  CUSTOMER NAME       char (40) )                                    │
│ CREATE TABLE CUSTOMER RELATION TABLE                            │
│ (CUSTOMER fr         char (8)        references CUSTOMER DIMENSION TABLE, │
│  CUSTOMER to         char (8)        references CUSTOMER DIMENSION TABLE, │
│  DURATION            time,                                          │
│  TIME                timestamp )                                    │
└─────────────────────────────────────────────────────────────────────┘
```

*Fig. 7B*

```
with recursive w_path as (begin, origin, target, dist, edgeID)
( select CUSTOMER fr, CUSTOMER fr, CUSTOMER to, 1
  from CUSTOMER RELATION TABLE
  union all
  select WPT.begin, GED.origin, GED.target,
           WPT.dist + 1, WPT.edgeID
  from w_path as WPT, CUSTOMER RELATION TABLE as GED
  where WPT.target = GED.origin
  union all
  select WPT.target, GED.target, GED.origin,
           WPT.dist + 1, WPT.edgeID
  from w_path as WPT, CUSTOMER RELATION TABLE as GED
  where WPT.target = GED.target
  search depth first by origin set path
  cycle edgeID set cmark to 'Y' default 'N' using path
),
w_minPath(begin, target, minDist) as
( select begin, target, min(dist) as deg
  from w_path
  group by begin, target
),
w_clsCent(begin, deg) as
( select begin,
    ((select count(*) from node) - 1)/sum(minDist)
  from w_minPath
  group by begin
),
w_adjNode(begin, deg) as
( select begin, deg
  from w_clsCent as NC
  where NC.deg = (select max(deg) from w_clsCent), select begin
from w_adjNode
union all
select CUSTOMER to
from w_adjNode, CUSTOMER RELATION TABLE
where w_adjNode.begin =CUSTOMER RELATION TABLE.
CUSTOMER fr
```

```
                                              ┌─ Q02
SELECT
 C. CUSTOMER NAME, T. PERIOD NAME, SUM (H. SELLING PRICE * H. QUANTITY)
FROM
 CUSTOMER SALES HISTORY TABLE H    ┐
INNER JOIN PERIOD DIMENSION TABLE  T
 ON H. PERIOD CD = T. PERIOD CD         ├ CARTESIAN PRODUCT OF
INNER JOIN AREA DIMENSION TABLE D       │  STAR SCHEMA
 ON H. AREA CD = D. AREA CD
INNER JOIN CUSTOMER DIMENSION TABLE C
 ON H. CUSTOMER id = C. CUSTOMER id ┘
WHERE
 D. AREA NAME="TOKYO"
GROUP BY
 C. CUSTOMER NAME, T. PERIOD NAME
```

*Fig. 13A*

QUERY RESULT — A02

| C. CUSTOMER NAME | T. PERIOD NAME | SUM VALUE |
|---|---|---|
| ⋮ | ⋮ | ⋮ |
| SUZUKI | SECOND QUARTER OF 2012 | 550 |
| ⋮ | ⋮ | ⋮ |

*Fig. 13B*

```
                                              ┌─ Q03
SELECT
  C. CUSTOMER NAME, SUM (H. SELLING PRICE * H. QUANTITY) as Sales_Total
FROM
  CUSTOMER SALES HISTORY TABLE H        ┐
  INNER JOIN PERIOD DIMENSION TABLE  T  │
  ON H. PERIOD CD = T. PERIOD CD        │   CARTESIAN PRODUCT OF
  INNER JOIN AREA DIMENSION TABLE D     ├        STAR SCHEMA
  ON H. AREA CD = D. AREA CD            │
  INNER JOIN CUSTOMER DIMENSION TABLE  C│
  ON H. CUSTOMER id = C. CUSTOMER id    ┘
WHERE
  D. AREA NAME="TOKYO"
GROUP BY
  C. CUSTOMER NAME
ORDER BY Sales_Total DESC
LIMIT BY 1
```

*Fig. 18*

```
select begin
from w_adjNode
union all
select CUSTOMER to
from w_adjNode, CUSTOMER RELATION TABLE
where w_adjNode.begin =CUSTOMER RELATION TABLE. CUSTOMER fr
```
— Q04

DATA ANALYSIS METHOD, DATA ANALYSIS DEVICE, AND STORAGE MEDIUM STORING PROCESSING PROGRAM FOR SAME

BACKGROUND

This invention relates to a technology for analyzing data accumulated in a database.

Companies and the like use a database such as a relational database (RDB) as a general business system to accumulate a huge volume of data. Such companies are developing a method of multidimensionally analyzing and visualizing accumulated customer data and sales data to solve business problems. Online analytical processing (OLAP), which is known as the method of multidimensionally analyzing data of this kind, provides a complicated analysis by manipulating multidimensional data. For example, in the OLAP, a history of a customer's product purchase is analyzed to execute an analysis at high speed from various dimensions such as area-specific sales, product-specific sales, and seasonal sales.

In the analysis of the database, it is demanded to create added value in terms of business by predicting a person's consumption behavior as disclosed in, for example, JP 2006-513462 A, JP 10-116190 A, and JP 2011-2911 A.

In contrast to the RDB, there is also known a graph database formed of a node and an edge. The graph database stores data for expressing complicated relations such as relations between a person and a person and delivery states in a physical distribution network in original forms, and does not need a schema definition in advance unlike the RDB. A graph analysis for performing an analysis by using the graph database has an object to finely determine persons, objects, and contents in accordance with a cluster property and a distance approximation property of data.

SUMMARY

However, the related-art data analysis for the RDB using the OLAP described above is basically a consolidation of data, and does not involve a fine data analysis. On the other hand, the graph analysis aims at fine determination of persons, objects, and contents in accordance with the cluster property and the distance approximation property of data.

To that end, in the graph analysis, relationships among persons, objects, and contents are analyzed in accordance with the cluster property and the distance approximation property of data. Then, combining data analyses such as the OLAP and a statistical analysis in order to examine a whole image of the data, correlations therebetween, potential structure thereof from the results of the graph analysis is implemented as individual systems. This raises a problem in that it is only possible to use a plurality of applications properly in order to perform a fine analysis for a huge volume of data.

Further, in a data analysis based on the OLAP, a query is processed with respect to a star schema formed of a dimension table and a history table to obtain a query result, and query targets are narrowed down by a range search for the dimension table. In other words, it is difficult to implement means for narrowing down data analysis targets without the range search for the dimension table.

Therefore, it is an object of this invention to implement a fine data analysis by combining a data analysis for an RDB and a graph analysis without using a plurality of applications.

A representative aspect of the present disclosure is as follows. A data analysis method for analyzing data on a data analysis apparatus comprising a storage, comprising: a first step of setting, by the data analysis apparatus, a plurality of dimension tables each comprising a first identifier for identifying data to be analyzed and attributes corresponding to the first identifier; a second step of setting, by the data analysis apparatus, a history table comprising a second identifier associated with each of the first identifiers of the plurality of dimension tables, and comprising attributes corresponding to the second identifier; a third step of setting, by the data analysis apparatus, a relation table for storing attributes relating to the first identifier, the plurality of dimension tables comprising a first dimension table associated with the relation table through the attributes relating to the first identifier; a fourth step of associating, by the data analysis apparatus, the first identifiers that refers to the first identifier of a first dimension table with the attributes; and a fifth step of processing, by the data analysis apparatus, a query for the relation table and the first dimension table, and generating a second dimension table as a result of the processing of the query.

According to one embodiment of this invention, a data size can be reduced by not holding duplicate dimension tables, and as a result of performing a graph analysis and an OLAP analysis, the number of pieces of data within the dimension table is reduced, and in addition, data processing amounts of cartesian product computation and graph processing are reduced.

BRIEF DESCRIPTION OF THE DRAWINGS

FIG. 5B is a diagram illustrating an example of a definition of the star schema according to the first embodiment of this invention.

FIG. 7B is a diagram illustrating an example of a definition used in a case of handling the graph structure according to the first embodiment of this invention according to the first embodiment of this invention.

FIG. 12 is a diagram illustrating an example of recursive query processing performed in the graph data analysis of the query processing part according to the first embodiment of this invention.

FIG. 13A illustrates an example of a query processing of the star schema according to the first embodiment of this invention.

FIG. 13B is a diagram an example of a dimension table showing a result of the query processing of the star schema according to the first embodiment of this invention.

FIG. 18 is a diagram illustrating an example of a query at the time of generating the second dimension table from the star schema according to the second embodiment of this invention.

DETAILED DESCRIPTION OF THE PREFERRED EMBODIMENTS

Now, embodiments of this invention are described with reference to the accompanying drawings.

First Embodiment

Figure 1:
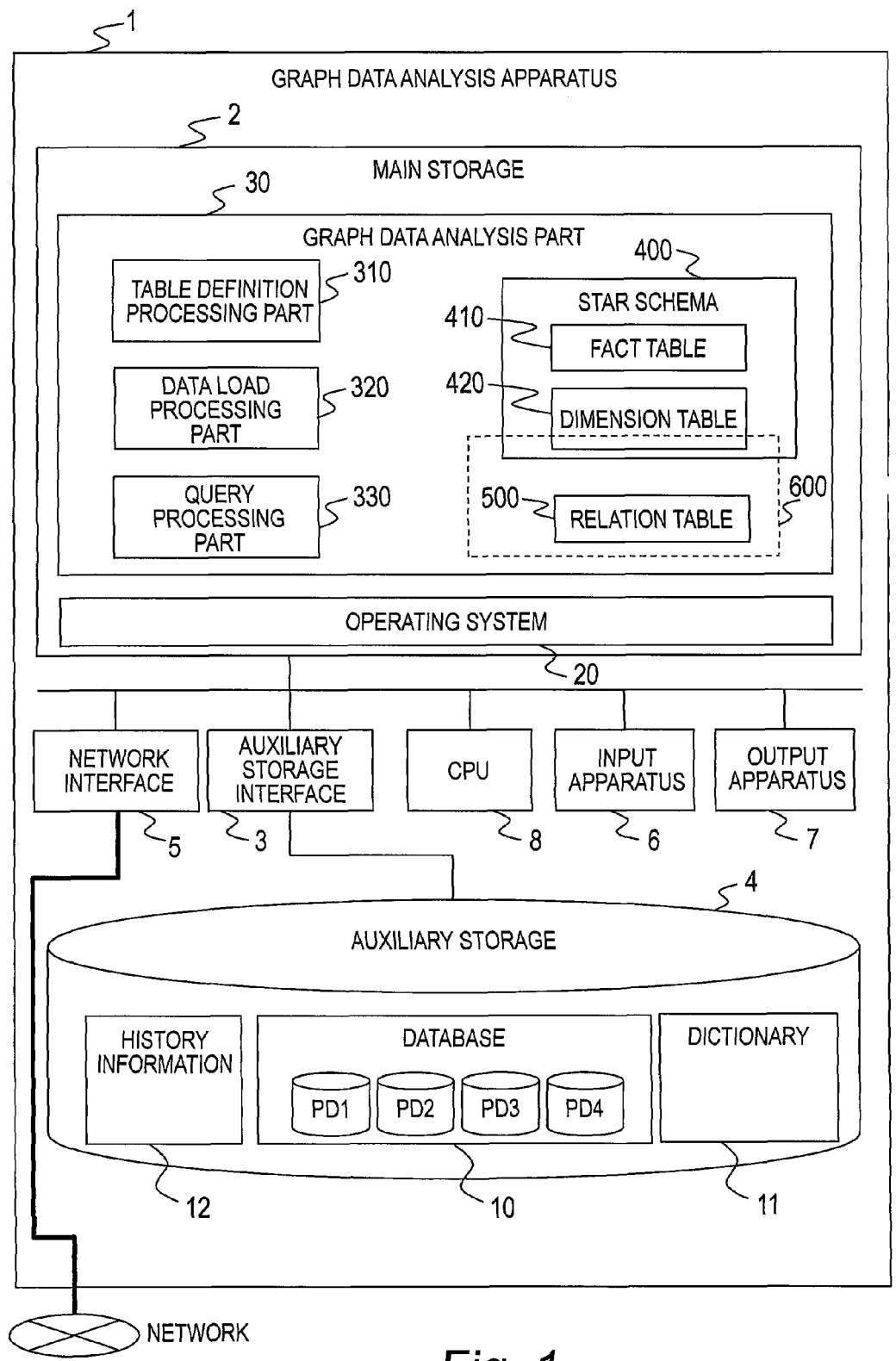
FIG. 1 is a block diagram illustrating an example of a graph data analysis apparatus according to a first embodiment of this invention.

FIG. 1 is a block diagram illustrating an example of a graph data analysis apparatus according to a first embodiment of this invention. A graph data analysis apparatus 1 is a computer for executing an analysis corresponding to a received query on data within databases PD1 to PD4 stored databases PD1 to PD4 storing in a database 10 and outputting an analysis result.

The graph data analysis apparatus 1 is a computer including a CPU 8 for performing an arithmetic operation, a main storage 2 for holding data and programs, an auxiliary storage 4 for storing the database 10 and programs, a network interface 5 for communications to/from a network (not shown), an auxiliary storage interface 3 for performing reading and writing from and to the auxiliary storage 4, an input apparatus 6 including a keyboard and a mouse, and an output apparatus 7 including a display and a speaker and the like.

An operating system (OS) 20 is loaded onto the main storage 2, and is executed by the CPU 8. Further, a graph data analysis part 30 for receiving a query and analyzing data runs on the OS 20. The graph data analysis part 30 includes, as processing units, a table definition processing part 310, a data load processing part 320, and a query processing part 330. The graph data analysis part 30 includes a star schema 400 and a relation table 500 as data to be processed and a data structure. The table definition processing part 310, the data load processing part 320, and the query processing part 330 serving as the processing units are loaded onto the main storage 2 and then executed by the CPU 8.

The CPU 8 operates in accordance with a program for each functional part, to thereby operate as a functional part for implementing a predetermined function. For example, the CPU 8 operates in accordance with a table definition program, to thereby function as the table definition processing part 310. The same applies to other programs. In addition, the CPU 8 operates as a functional part for implementing each of a plurality of processing executed by the respective programs. The computer and a computer system are an apparatus and a system including those functional parts.

Information on the programs, the data or the data structure, and the like for implementing respective functions of the graph data analysis part 30 can be stored in a storage device such as the auxiliary storage 4, a nonvolatile semiconductor memory, a hard disk drive, and a solid state drive (SSD), or a non-transitory computer-readable storage medium such as an IC card, an SD card, and a DVD.

The auxiliary storage 4 stores the database 10 serving as original data of data to be analyzed, a dictionary 11 for storing definitions of a structure of the database 10, a structure of the star schema 400, and the like, and history information 12 for storing data within a fact table 410 of the star schema 400. It should be noted that the OS 20 and the programs for the graph data analysis part 30 can be stored in the auxiliary storage 4 as described above although not shown. Further, FIG. 1 illustrates an example in which the star schema 400 is held in the main storage 2, but when the star schema 400 has a large size, a part of the star schema 400 may be held on the main storage 2, while the other may be stored in the auxiliary storage 4.

It should be noted that FIG. 1 illustrates an example in which the database 10 stores the databases PD1 to PD4 formed of an RDB, but the database 10 is the original data of the data to be analyzed, and can be formed of a replica or a part of an external database.

Further, the history information 12 is data obtained by extracting the data to be analyzed in time series from the data within the database 10, and is also used as the fact table 410 of the star schema 400. The dictionary 11 stores a definition of the history information 12, a definition of the star schema 400, and a definition of the relation table 500.

<Outline of Data Analysis>

In the graph data analysis apparatus 1 according to the embodiment of this invention, when online analytical processing (OLAP) is used to analyze the RDB as multidimensional data, a graph structure is extracted from the history information 12 to narrow down a data amount serving as a manipulation target of the OLAP.

Figure 2:
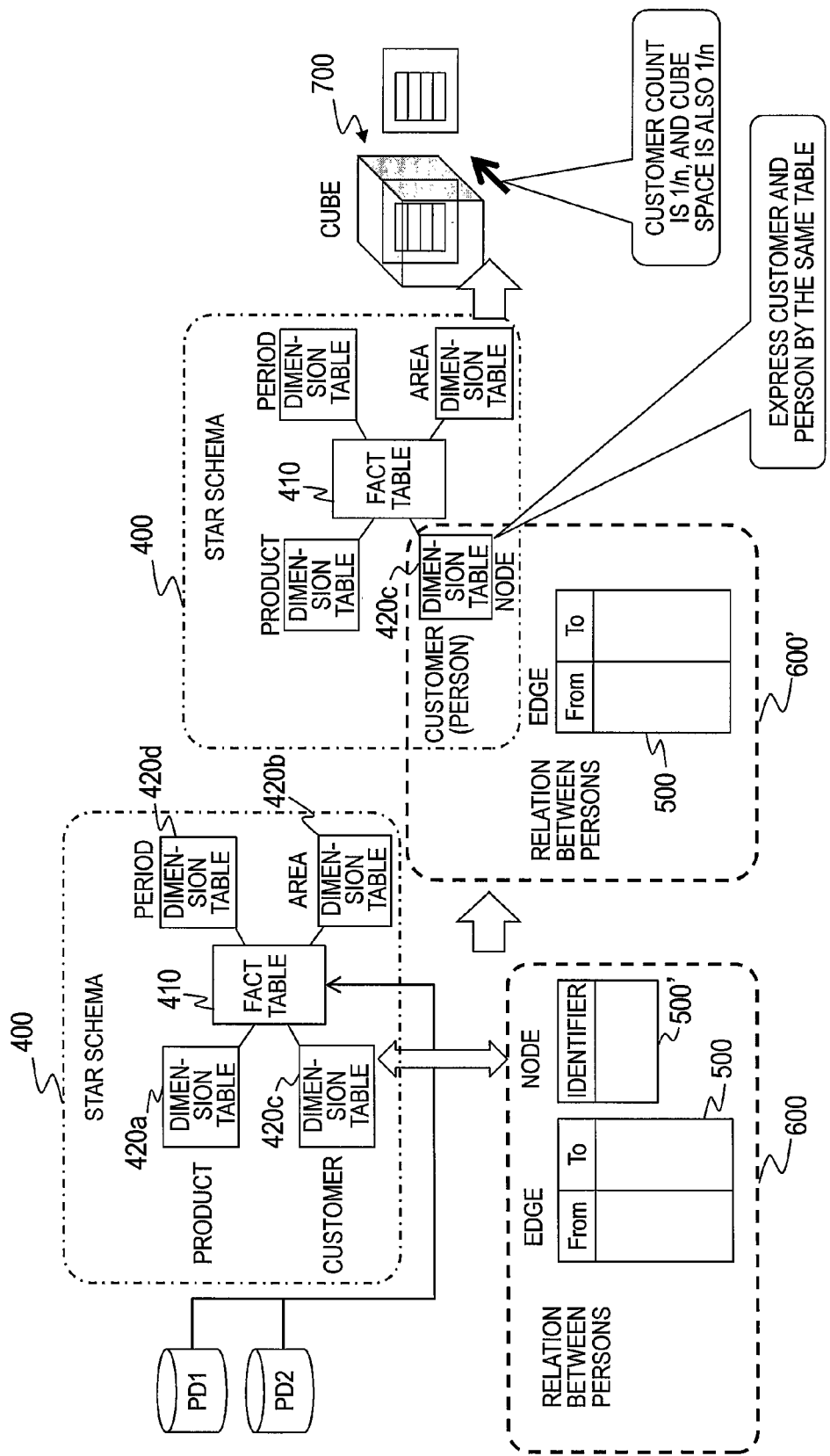
FIG. 2 is a block diagram illustrating an example of a relation between data used in the first embodiment of this invention.

FIG. 2 is a block diagram illustrating an example of a relation between data used in the embodiment of this invention. In the embodiment of this invention, a cube 700 serving as the manipulation target of the OLAP is a processing result of subjecting the star schema 400 to OLAP manipulation. A table group in which the star schema 400 is defined is formed of the fact table 410 including an entity of data extracted from the history information 12 using the database 10 as the original data and a plurality of dimension tables 420a to 420d in which data to be analyzed or summed up is defined. It should be noted that in the following description, the dimension tables are collectively referred to as "dimension table 420". The fact table 410 and the dimension table 420 are associated with each other by a primary key.

Figure 4:
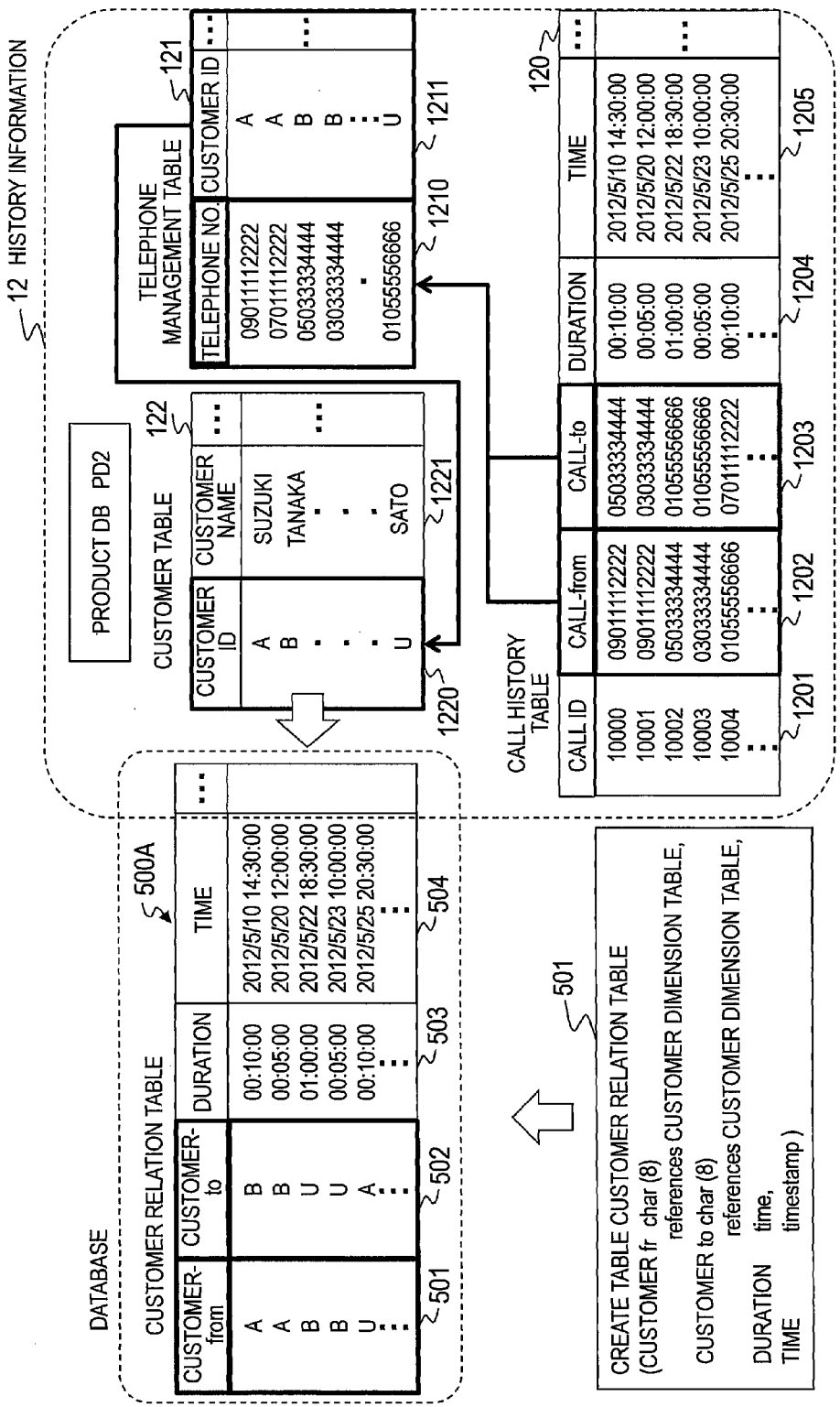
FIG. 4 illustrates an example of a relation between data from which the relation table is generated according to the first embodiment of this invention.
Figure 7A:
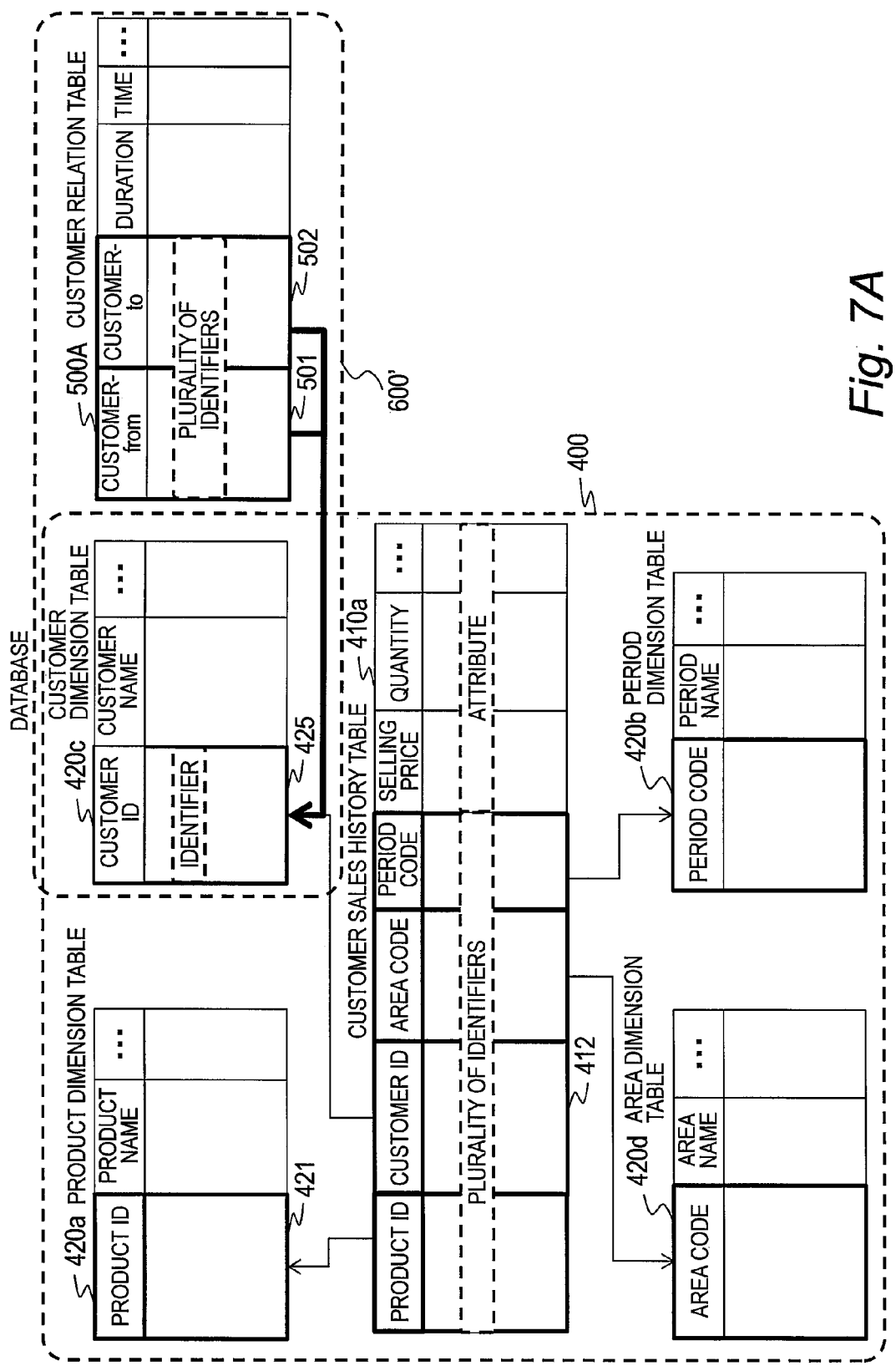
FIG. 7A is a diagram indicating a combination of data in a case of handling the combination of the customer dimension table and the customer relation table as the graph structure according to the first embodiment of this invention.
Figure 8:
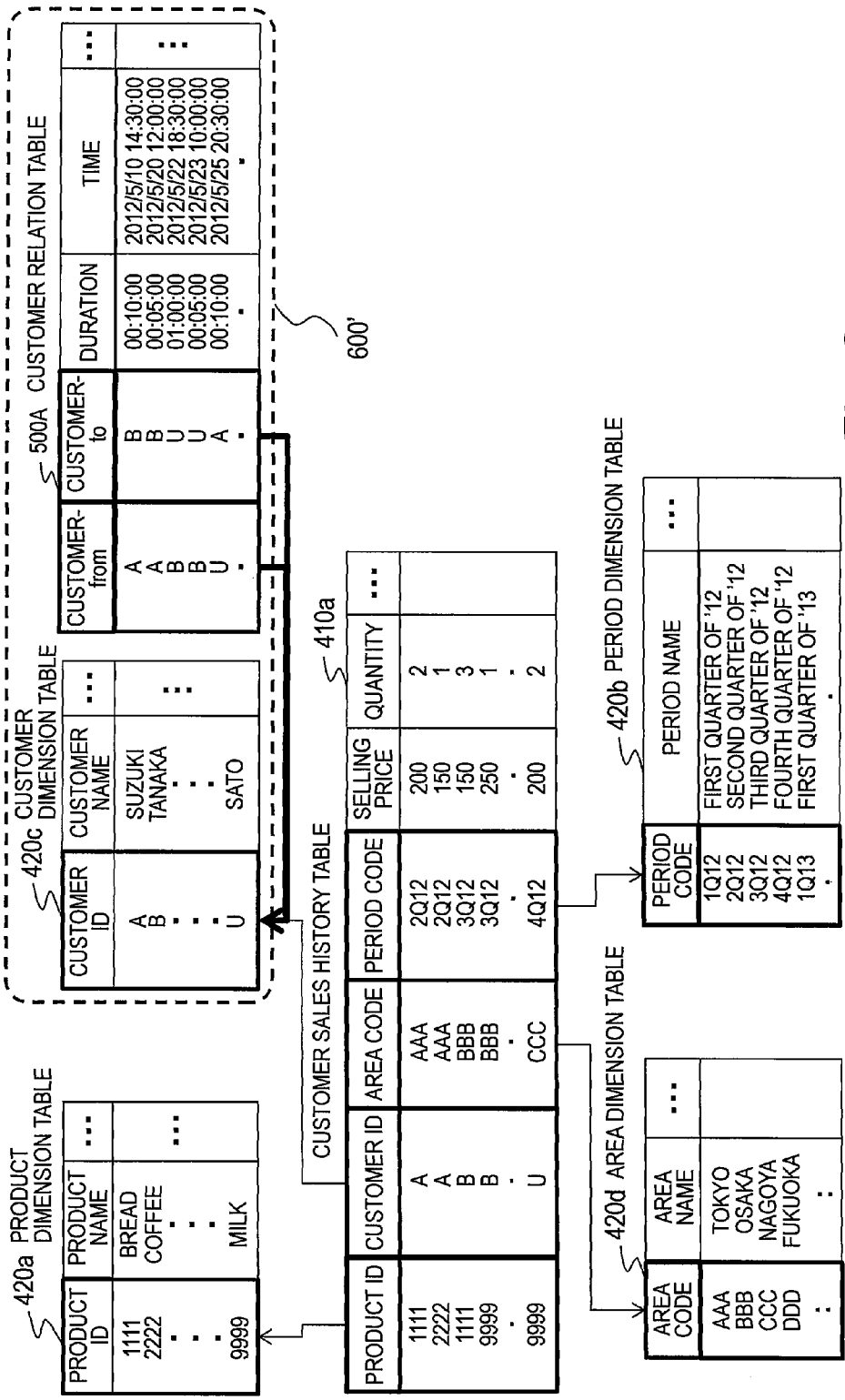
FIG. 8 illustrates a state in which actual data is captured from the databases to the star schema and the customer relation table according to the first embodiment of this invention.

In the example of FIG. 2, the database PD1 is a sales database, and as the history information 12, a customer sales history table is provided as shown in FIG. 7A and FIG. 8. The database PD2 is a call database, and as the history information 12, a call history table is provided as shown in FIG. 4.

Further, FIG. 2 illustrates an example in which the structure of the star schema 400 is formed of the dimension tables 420 for a product, a customer, a period, and an area with respect to the fact table 410, and an example in which relationships among persons (customers) are focused on as the graph structure.

Therefore, the dimension table 420a is a product dimension table relating to a product name as shown in FIG. 7A, the dimension table 420b is a period dimension table relating to a period as shown in FIG. 7A, the dimension table 420c is a customer dimension table relating to an identifier of the customer as shown in FIG. 7A, and the dimension table 420d is an area dimension table relating to an area name as shown in FIG. 7A.

Further, a graph structure 600 indicates an example in which the relationships among persons is focused on, and is formed of an identifier of a person and the relationships among persons. The graph structure 600 is formed of a node and an edge indicating relationships among nodes, and the node includes a primary key.

When it is assumed here that the customer dimension table 420c of the star schema 400 and the graph structure 600 focusing on persons have the same data as targets thereof, as illustrated in FIG. 2, the customer dimension table 420c of the star schema 400 and a node 500' included in the graph structure 600 may be recognized as being the same.

In other words, it suffices that one of the dimension tables 420 of the star schema 400 is set as the node, and only the edge is held as graph data itself. Therefore, by combining the dimension table 420 having the same data with the node, it is possible to prevent the data on the node from being held duplicately. Thus, it is possible to reduce the data amounts of the dimension table 420 of the star schema 400 and the graph structure 600.

In a case of processing a query, when an OLAP analysis is performed for the fact table 410 relating to the person, the data within the target dimension table is first narrowed down by a graph data analysis using the graph structure 600. Up to now, the data is narrowed down only by a range search for the dimension table.

In other words, by narrowing down a target customer count to 1/n by the graph data analysis, it is possible to reduce the data within the customer dimension table 420c.

Accordingly, when the dimension table 420 based on which the fact table 410 is to be narrowed down can be expressed by the graph structure 600, the dimension table 420 can be narrowed down by the graph data analysis, and hence the data amount of the manipulation target of the later OLAP is greatly reduced, which can reduce a time period necessary for the analysis.

Figure 3A:
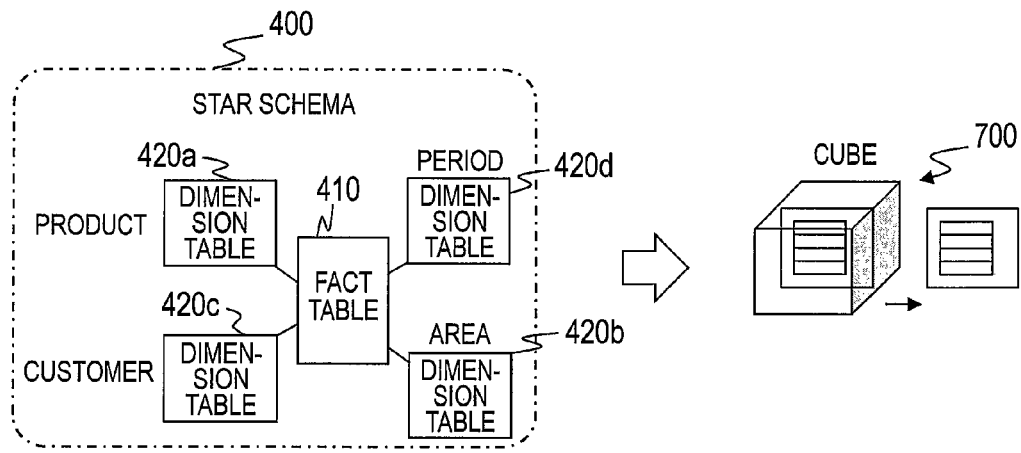
FIG. 3A is a diagram illustrating a relation between the star schema and the cube according to the first embodiment of this invention.

FIG. 3A is a diagram illustrating a relation between the star schema 400 and the cube 700. The value numbers of the primary keys for the respective dimension tables 420a to 420d of the star schema 400 are set as w, x, y, and z. The cube 700 needs a calculation amount of O (a×b×c×d) in order to calculate a consolidation value for each cell of a space defining a cube. For example, the calculation amount is (product count)×(customer count)×(period count)×(area count).

Figure 3B:
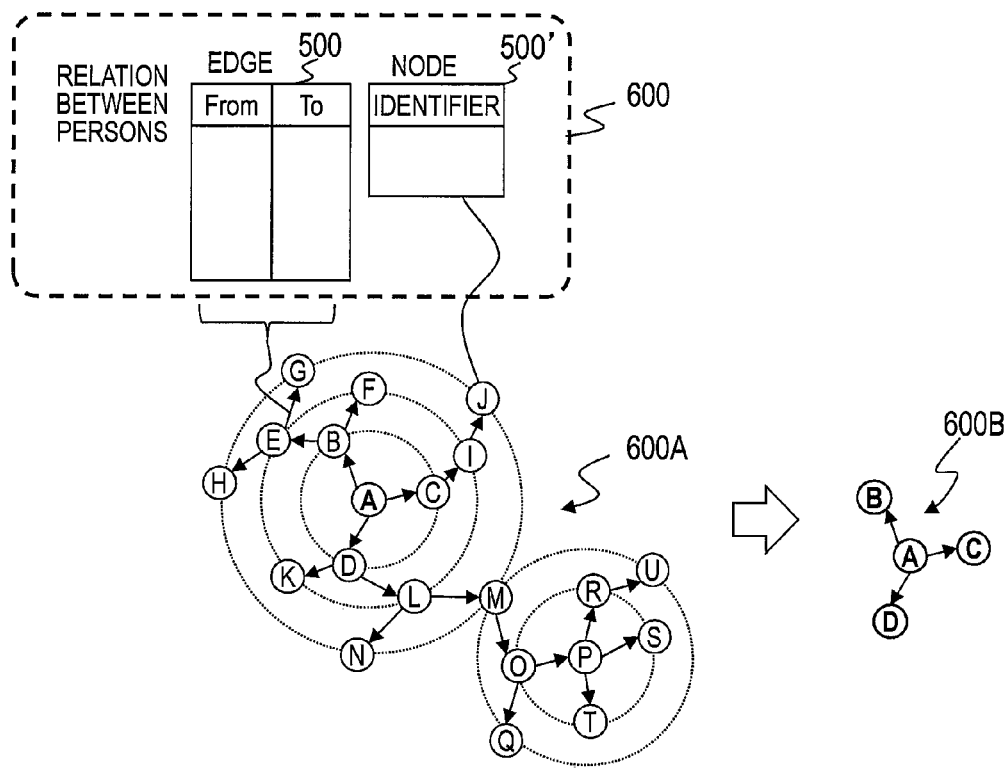
FIG. 3B is a diagram illustrating an example of the graph structure and a graph expression according to the first embodiment of this invention.

FIG. 3B is a diagram illustrating an example of the graph structure and a graph expression. The graph structure 600 is formed of the node and the edge (for expressing a relation between nodes), and the node includes the primary key. For example, when the relationships among persons are expressed by the graph structure 600, the node includes the identifier of the person as the primary key.

In FIG. 3B, when a specific person and persons around the specific person (in FIG. 3B, within one hop) are calculated as a result of performing the graph data analysis (path analysis and centrality analysis) from a graph expression 600A, a graph of four persons indicated by "A" to "D" is obtained as a graph expression 600B. As a result, the number of persons serving as the manipulation target of the OLAP is 1/n.

In the embodiment of this invention, the relation table 500 corresponding to the graph structure is generated from the history information 12. Then, the graph data analysis is carried out for the dimension table 420 recognized as the same table as the relation table 500, to thereby narrow down the data serving as the manipulation target of the OLAP.

<Generation of Relation Table>

Next, FIG. 4 illustrates an example of a relation between data from which the relation table 500 is generated. FIG. 4 illustrates an example in which a customer relation table 500A is generated as the relation table 500 indicating relationships among customers from the call database of the database PD2 by using a call history table 120, a telephone management table 121, and a customer table 122. This processing is performed by the table definition processing part 310 of the graph data analysis part 30 illustrated in FIG. 1.

The call history table 120 has one record (or row) formed of a call identifier 1201 for identifying a call, telephone-from 1202 for storing a telephone number of a calling party, telephone-to 1203 for storing a telephone number of a called party, a call duration 1204, a time 1205, and the like. It should be noted that the time 1205 is a time set in advance such as a start time or an end time of the call.

The telephone management table 121 has one record (or row) formed of a telephone number 1210 and a customer identifier 1211 indicating a user of the telephone.

The customer table 122 has one record (or row) formed of a customer identifier 1220 and a customer name 1221.

In this embodiment, the graph structure 600 corresponding to the edge between customers is acquired as the customer relation table 500A from the customer identifier, the calling party (telephone-from 1202), and the called party (telephone-to 1203). It should be noted that in the history information 12 of the above-mentioned call database, a calling rate can be calculated for each customer name from a total amount of the call duration or the like with reference to the call history table 120, the telephone management table 121, and the customer table 122.

First, the table definition processing part 310 acquires the customer identifier of the calling party and the customer identifier of the called party from the telephone management table 121 with telephone numbers stored in the telephone-from 1202 and the telephone-to 1203 of the call history table 120 as keys. Further, the table definition processing part 310 acquires the customer name 1221 corresponding to each customer identifier from the customer table 122.

Subsequently, the table definition processing part 310 generates the customer relation table 500A having one record (or row) formed of customer-from 501 indicating the telephone-from 1202 of the call history table 120 as the customer identifier of the calling party, customer-to 502 indicating the telephone-to 1203 as the customer identifier of the called party, a duration 503 for storing the duration 1204, and a time 504 for storing the time 1205.

Subsequently, the table definition processing part 310 sets a definition 510 indicating that the customer identifiers of the customer-from 501 and the customer-to 502 correspond to the customer dimension table 420c in regard to the generated customer relation table 500A.

<Generation of Star Schema 400>

Figure 5A:
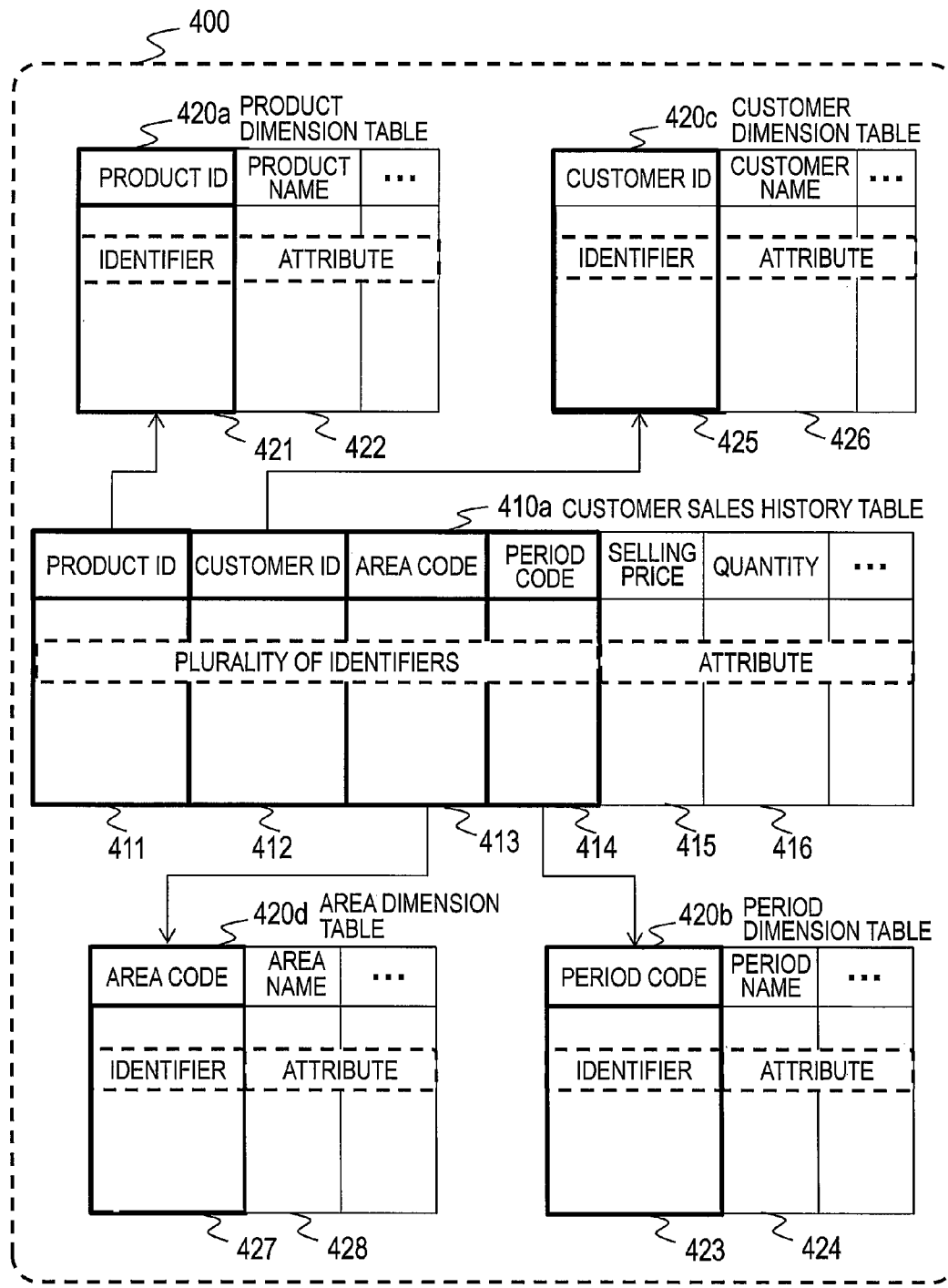
FIG. 5A is a diagram illustrating a relation between data at a time of generating a star schema according to the first embodiment of this invention.

Next, an example of a relation between data based on which the star schema 400 is generated is described with reference to FIG. 5A and FIG. 5B. FIG. 5A is a diagram illustrating a relation between data at a time of generating a star schema. FIG. 5B is a diagram illustrating an example of a definition of the star schema.

FIG. 5A illustrates an example of generating the dimension table 420 and the fact table 410 illustrated in FIG. 2 from the sales database of the database PD1. This processing is performed by the table definition processing part 310 of the graph data analysis part 30 illustrated in FIG. 1. It should be noted that this embodiment describes an example of generating a customer sales history table 410a as the fact table 410.

The table definition processing part 310 generates the customer sales history table 410a from the sales database of the database PD1. The customer sales history table 410a has one record (or row) formed of a product identifier 411 of a sold product, a customer identifier 412 of a customer who purchases the product, an area code 413 of an area in which the product is sold, a period code 414 for storing a timing at which the product is sold, a selling price 415 for storing a price for which the product is sold, and a quantity sold 416. It should be noted that in this embodiment, the product identifier 411, the customer identifier 412, the area code 413, and the period code 414 of the customer sales history table 410a are handled as a plurality of identifiers, and the selling price 415 and the quantity sold 416 are handled as attributes.

Subsequently, the table definition processing part 310 generates the product dimension table 420a using the product identifier 411 of the customer sales history table 410a as the primary key from the sales database. The product dimension table 420a has one record (or row) formed of a product identifier 421 serving as the primary key and a product name 422. Further, in this embodiment, the product identifier 421 is handled as an identifier associated with the product identifier 411 of the customer sales history table 410a, and the product name 422 is handled as an attribute.

Subsequently, the table definition processing part 310 generates the customer dimension table 420c using the customer identifier 412 of the customer sales history table 410a as the primary key from the sales database. The customer dimension table 420c has one record (or row) formed of a customer identifier 425 serving as the primary key and a customer name 426. Further, in this embodiment, the customer identifier 425 is handled as an identifier associated with the customer identifier 412 of the customer sales history table 410a, and the customer name 426 is handled as an attribute.

Subsequently, the table definition processing part 310 generates the area dimension table 420d using the area code 413 of the customer sales history table 410a as the primary key from the sales database. The area dimension table 420d has one record (or row) formed of an area code 427 serving as the primary key and an area name 428. Further, in this embodiment, the area code 427 is handled as an identifier associated with the area code 413 of the customer sales history table 410a, and the area name 428 is handled as an attribute.

Subsequently, the table definition processing part 310 generates the period dimension table 420b using the period code 414 of the customer sales history table 410a as the primary key from the sales database. The period dimension table 420b has one record (or row) formed of a period code 423 serving as the primary key and a period name 424 serving as an attribute. Further, in this embodiment, the period code 423 is handled as an identifier associated with the period code 414 of the customer sales history table 410a, and the period name 424 is handled as an attribute.

FIG. 5B is an example of a definition 520 of the star schema 400. The table definition processing part 310 reads the definition 520 of FIG. 5B, and generates the fact table 410 (customer sales history table 410a) and the dimension tables 420 illustrated in FIG. 5A.

<Setting of Graph Structure>

Figure 6:
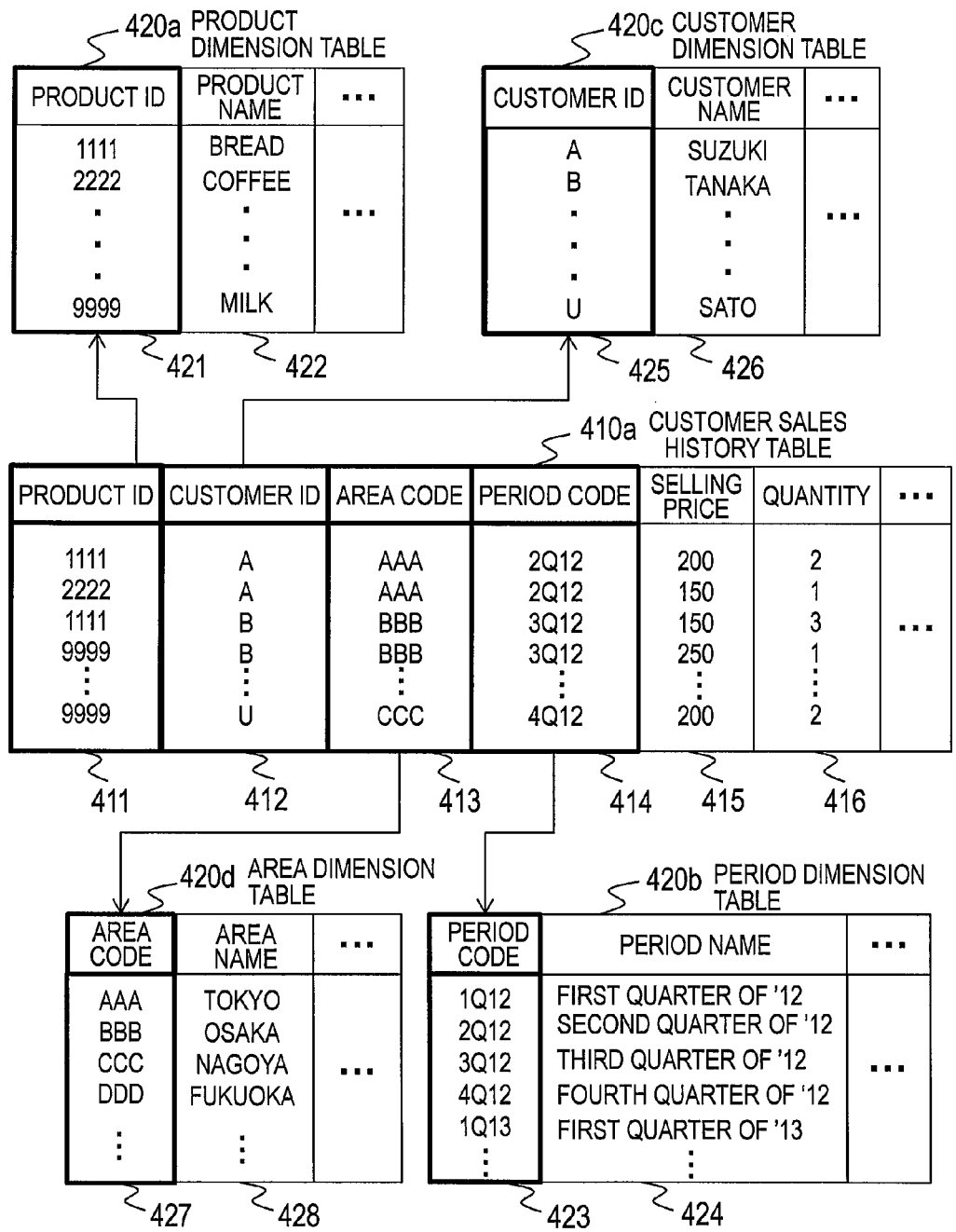
FIG. 6 shows a state in which the table definition processing part generates the star schema illustrated in and the data within the sales database of the database PD1 is captured according to the first embodiment of this invention.

FIG. 6 shows a state in which the table definition processing part 310 generates the star schema 400 illustrated in FIG. 5A and the data within the sales database of the database PD1 is captured.

Here, the customer dimension table 420c uses the customer identifier 425 as the primary key, which clarifies that the customer dimension table 420c can be formed of the same data as that of the node of the graph structure 600 illustrated in FIG. 2. On the other hand, in the customer relation table 500A illustrated in FIG. 4, an orientation of the call between the customer identifiers (customer-from 501 and customer-to 502) can be handled as the edge indicating a correlation between customers.

Therefore, in the embodiment of this invention, by setting the customer identifier 425 of the customer dimension table 420c as the node and using the customer-from 501 and the customer-to 502 of the customer relation table 500A indicating the correlation in calling history between customers as the edge as illustrated in FIG. 4, the customer dimension table 420c of the star schema 400 and the customer relation table 500A are combined, to be handled as the graph structure 600.

FIG. 7A is a diagram indicating a combination of data in a case of handling the combination of the customer dimension table 420c and the customer relation table 500A as the graph structure 600. The customer identifier 425 of the customer dimension table 420c of the star schema 400 connected by the bold line in FIG. 7A is set as the node, and the customer-from 501 and the customer-to 502 of the customer relation table 500A are set as From and To of the edge.

Therefore, a graph structure 600' can be formed by setting the customer dimension table 420c of the star schema 400 as the node and setting the customer relation table 500A as the edge. Accordingly, it suffices that the relation table 500 holds only the edge without including the node of the graph data, and hence there is an advantage in that the data amount of the combination of the star schema 400 and the graph structure 600 can be reduced.

In addition, in the query processing described later, a high speed data analysis using the OLAP can be implemented by carrying out the graph data analysis for the graph structure 600' of FIG. 7A and narrowing down the data amount of the customer sales history table 410a serving as the fact table 410 to be manipulated.

FIG. 7B is a diagram illustrating an example of a definition 530 used in a case of handling the graph structure 600 from the combination of the customer dimension table 420c and the customer relation table 500A. The definition 530 is an example of defining the customer dimension table 420c serving as the node and further defining the customer relation table 500A serving as the edge.

FIG. 8 illustrates a state in which actual data is captured from the databases PD1 and PD2 to the star schema 400 and the customer relation table 500A of FIG. 7A. When receiving a query, the graph data analysis part 30 can perform the analysis after performing the narrowing down by using the graph structure 600' in terms of the customer from the dimension table 420 and the customer sales history table 410a of the star schema 400 and the customer relation table 500A.

<Table Definition Processing Part>

Figure 9:
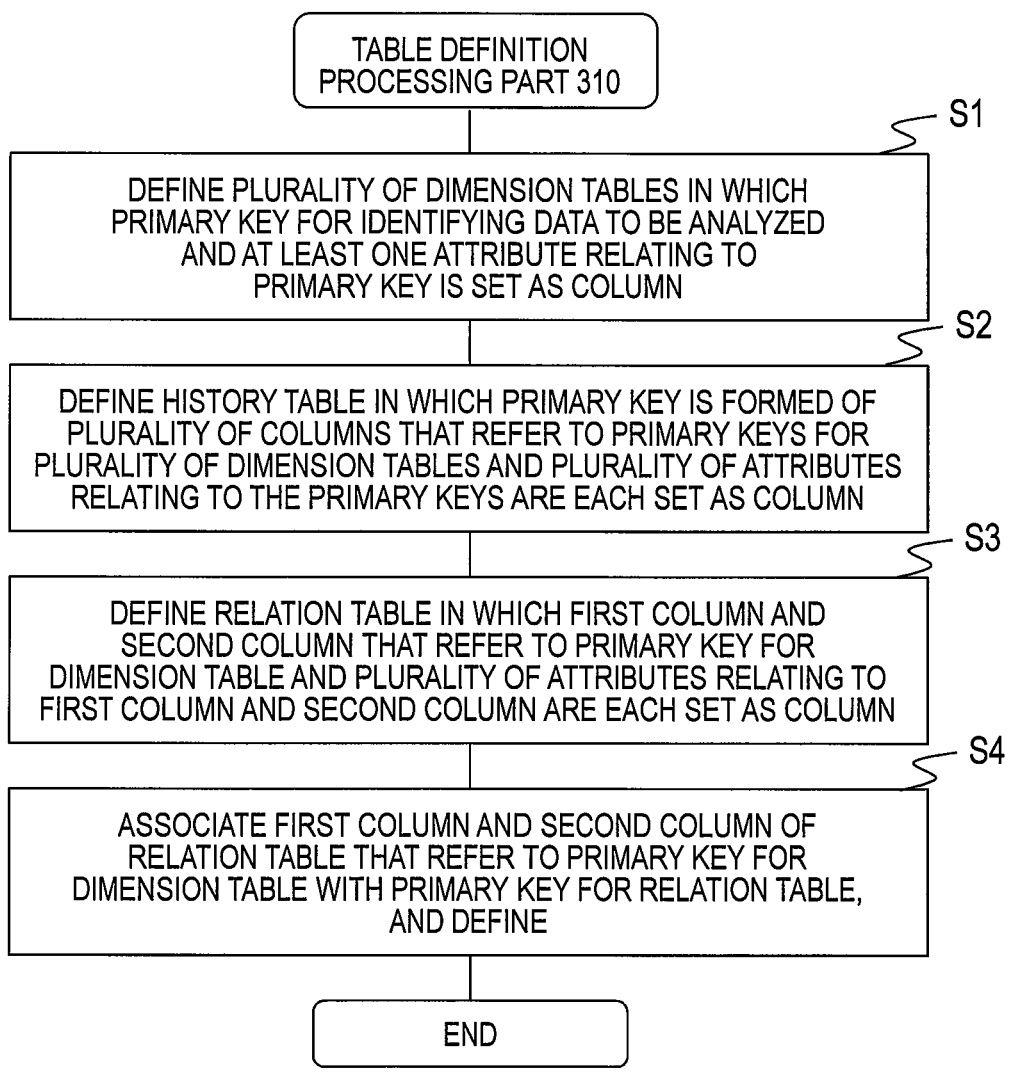
FIG. 9 is a flow chart illustrating an example of processing performed by the table definition processing part according to the first embodiment of this invention.

FIG. 9 is a flow chart illustrating an example of processing performed by the table definition processing part 310. This processing is executed when the graph data analysis apparatus 1 receives a query. The table definition processing part 310 defines a database to be analyzed by the query. In other words, the table definition processing part 310 defines the relation table 500 for storing relationships among events and objects, the dimension table 420 that can describe the meaning of real-world data, a history table for storing the real-world data as collective time-series data, and a relation between the relation table 500 and the dimension table 420.

The table definition processing part 310 defines a plurality of dimension tables 420 in which the primary key for identifying the data to be analyzed designated by the query and at least one attribute relating to the key are set as the columns (S1). This processing corresponds to "CREATE TABLE . . . DIMENSION TABLE" of FIG. 5B.

Subsequently, the table definition processing part 310 defines the history table in which the primary key is formed of a plurality of columns that refer to the primary keys for a plurality of dimension tables 420 and at least one attribute relating to those primary keys is set as a column (S2). This processing corresponds to "CREATE TABLE CUSTOMER SALES HISTORY TABLE" of FIG. 5B.

Subsequently, the table definition processing part 310 defines a relation table in which the first column and the second column that refer to the primary key for the dimension table 420 and at least one attribute relating to the first column and the second column is set as a column (S3). This processing corresponds to "CREATE TABLE CUSTOMER RELATION TABLE" of FIG. 7B and the definition 510 of FIG. 4 (S3).

Subsequently, the table definition processing part 310 performs a definition for associating the first column and the second column of the relation table 500 that refers to the primary key for the dimension table 420 with the primary key for the relation table 500. This processing corresponds to "CREATE TABLE CUSTOMER DIMENSION TABLE" and "CREATE TABLE CUSTOMER RELATION TABLE" of FIG. 7B (S4). By this processing, the graph structure 600' of FIG. 8 is set.

By the above-mentioned processing, the star schema 400, the relation table 500, and the graph structure 600' are defined as illustrated in FIG. 7A.

<Data Load Processing Part>

Figure 10:
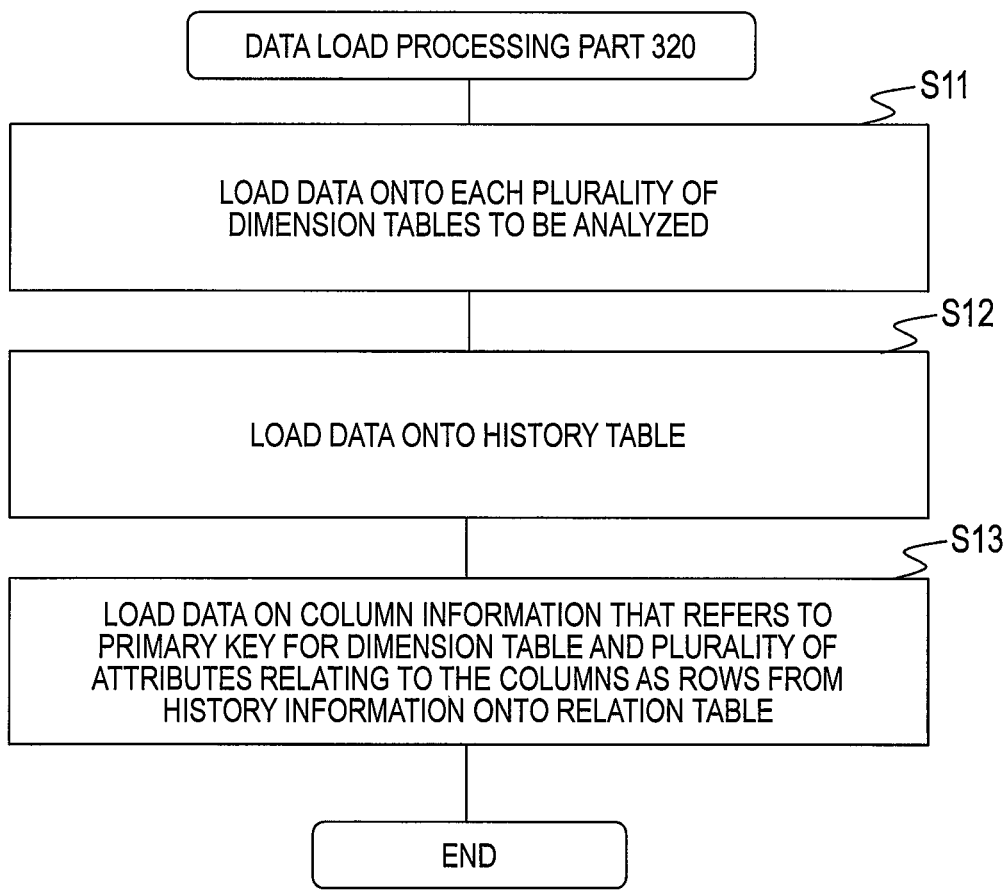
FIG. 10 is a flow chart illustrating an example of processing performed by the data load processing part according to the first embodiment of this invention.

FIG. 10 is a flow chart illustrating an example of processing performed by the data load processing part 320 of the graph data analysis apparatus 1. This processing is executed after the processing of FIG. 9 is completed. Alternatively, this processing is performed when an administrator or the like performs an instruction for execution through the input apparatus 6.

The data load processing part 320 loads data from the database 10 onto each of the dimension tables 420 to be analyzed which are generated by the table definition processing part 310 (S11).

Subsequently, the data load processing part 320 loads data from the database 10 onto the customer sales history table 410a (fact table 410) to be analyzed which is generated by the table definition processing part 310 (S12).

The data load processing part 320 loads column information that refers to the primary key for the dimension table 420 and the attribute relating to the columns as rows from the history information 12 to the relation table 500 (S13).

By the above-mentioned processing, the data within the database 10 is captured into the dimension table 420 and the fact table 410 of the star schema 400 and the relation table 500 that refers to the dimension table 420. As a result, for example, as illustrated in FIG. 8, the data is stored in the star schema 400 and the relation table 500.

<Query Processing Part>

Figure 11:
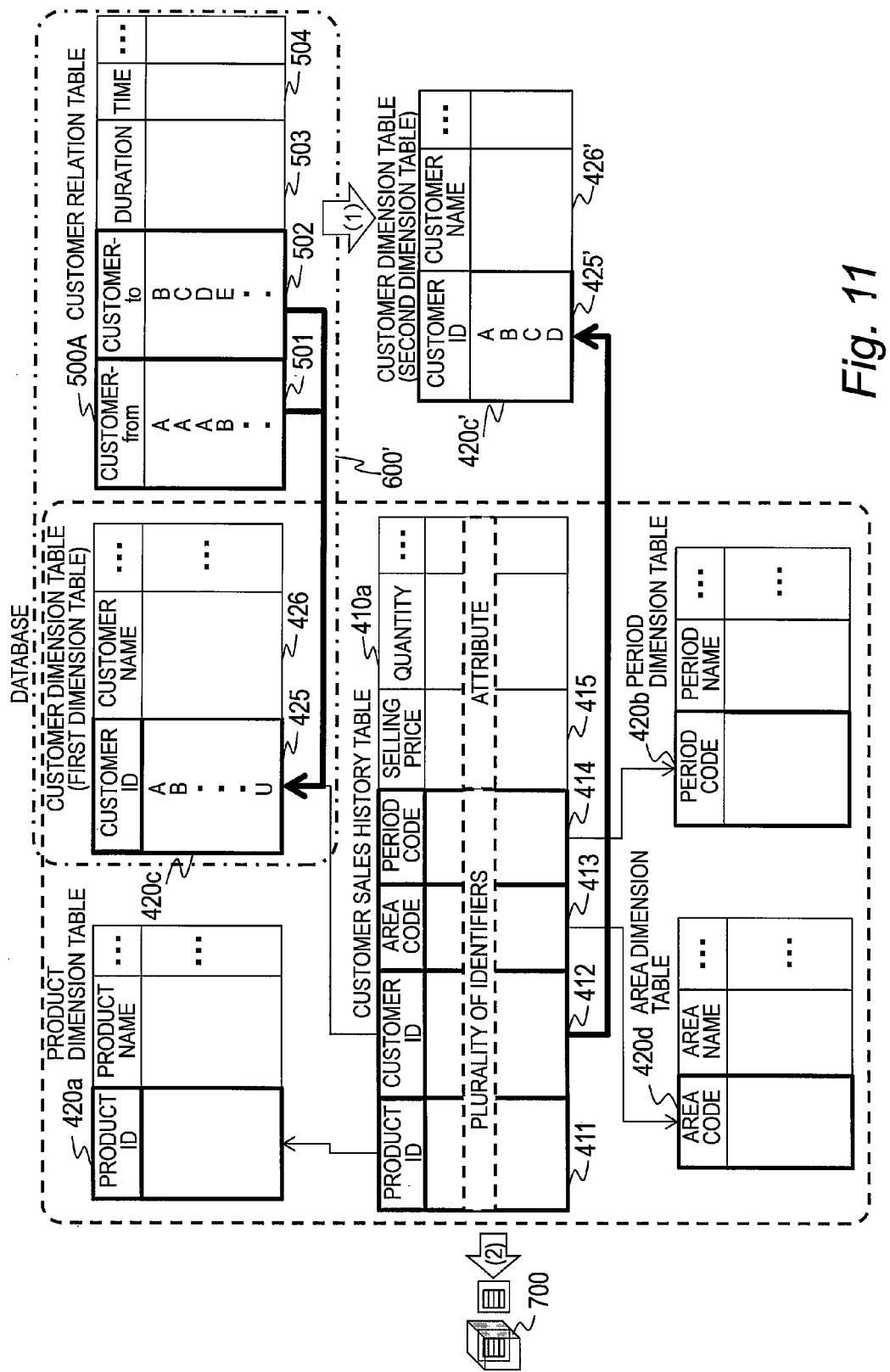
FIG. 11 is a diagram illustrating an example of the query processing for an integration analysis relating to the product and the customer according to the first embodiment of this invention.

Next described is an example of processing performed by the query processing part 330 of the graph data analysis apparatus 1. FIG. 11 is a diagram illustrating an example of the query processing for an integration analysis relating to the product and the customer. This processing is executed when the graph data analysis apparatus 1 receives a query from the network interface 5 or the input apparatus 6.

In the example of FIG. 11, the customer dimension table 420c (first dimension table) includes data whose customer identifiers 425 are "A" to "U", and forms the node of the graph structure 600'. The customer relation table 500A also includes data whose customer identifiers "A" to "U" in the customer-from 501 and the customer-to.

The query processing part 330 narrows down the data by using the customer identifier (or customer name) in accordance with the contents of the query. For example, an example in which the analysis is performed for customers relating to a customer who has the largest sum of the selling price 415 with the area code 413 being x and the period code 414 being y is described.

First, the query processing part 330 calculates a total sum of the selling price 415 for each customer identifier 412 whose area code 413 and period code 414 satisfy a condition of the query, and extracts the customer identifier "A" for which the above-mentioned total sum is maximum.

Subsequently, the query processing part 330 extracts the customer identifier relating to the customer identifier 425 of "A" from the graph structure 600' by the graph data analysis as described later with reference to FIG. 12. As a result, the customers whose customer identifiers are "A" to "D" are extracted, and the fact that the correlation between those customers is indicated by the graph expression 600B of FIG. 3B is output (in FIG. 11, (1)).

Here, the query processing part 330 uses a customer dimension table 420c' obtained by narrowing down the customer identifiers 425 to "A" to "D" as a second dimension table for the subsequent analysis processing. In other words, in the subsequent analysis of the star schema 400, the query is executed by associating the customer dimension table 420c' serving as the second dimension table obtained by narrowing down the first dimension table with the customer sales history table 410a (fact table 410) in addition to the product dimension table 420a, the period dimension table 420b, and the area dimension table 420d.

Therefore, the OLAP manipulation or the like can be performed after narrowing down the data amount of the dimension table 420c' (second dimension table) corresponding to the graph structure 600', and it is possible to implement the processing with a small data amount at high speed.

FIG. 12 is a diagram illustrating an example of recursive query processing performed in the graph data analysis of the query processing part 330. This processing indicates an example of obtaining closeness centrality (centrality analysis) by the recursive query, and indicates recursive processing for extracting the customer relating to the customer identifier "A" from a state of the graph expression 600A illustrated in FIG. 3B as the graph expression 600B. In other words, FIG. 12 illustrates an example of processing for extracting the customer identifier 425 of the second dimension table 420c' from the graph structure 600' of the first dimension table 420c and the customer relation table 500A illustrated in FIG. 11 by the graph data analysis.

First, Q1 of FIG. 12 indicates processing in which the query processing part 330 calculates paths and distances from a specific node to all nodes in regard to the customer-from 501 and the customer-to 502 of the customer relation table 500A. In other words, a distance between the customer-from 501 and the customer-to 502 within the customer relation table 500A of FIG. 4 is calculated. Here, as the distance between the customer-from 501 and the customer-to 502, as illustrated in FIG. 4, a similarity is obtained from an integrated value of the duration 503 of call, a time slot in which the call is performed, or the like, and the distance becomes the smaller value as the similarity becomes higher. It should be noted that a well-known or publicly-known method may be used for a distance between humans in addition to the above-mentioned similarity.

Q2 of FIG. 12 indicates processing in which the query processing part 330 obtains a minimum path (minPath) from a specific node to all the nodes within the customer relation table 500A. In this processing, the shortest path is extracted from among paths to other nodes relating to a given node.

Subsequently, in Q3, the query processing part 330 calculates the total sum of the distance of the minimum path, and calculates the reciprocal of the total sum of the distance. Subsequently, in Q4, the query processing part 330 determines the node (for example, "A") in which the reciprocal of the total sum of the distance of the minimum path is maximum, as the closeness centrality.

Subsequently, in Q5 of FIG. 12, the query processing part 330 obtains the node adjacent to the node in which the reciprocal of the total sum of the distance of the minimum path becomes maximum. As a result, the graph expression 600B as illustrated in FIG. 3B is obtained.

As described above, as illustrated in the graph expression 600B of FIG. 3B, the query processing part 330 can extract the customer identifiers "B" to "D" within a predetermined range from the customer identifier "A" serving as the center of the graph expression 600B by the graph data analysis.

Figure 13C:
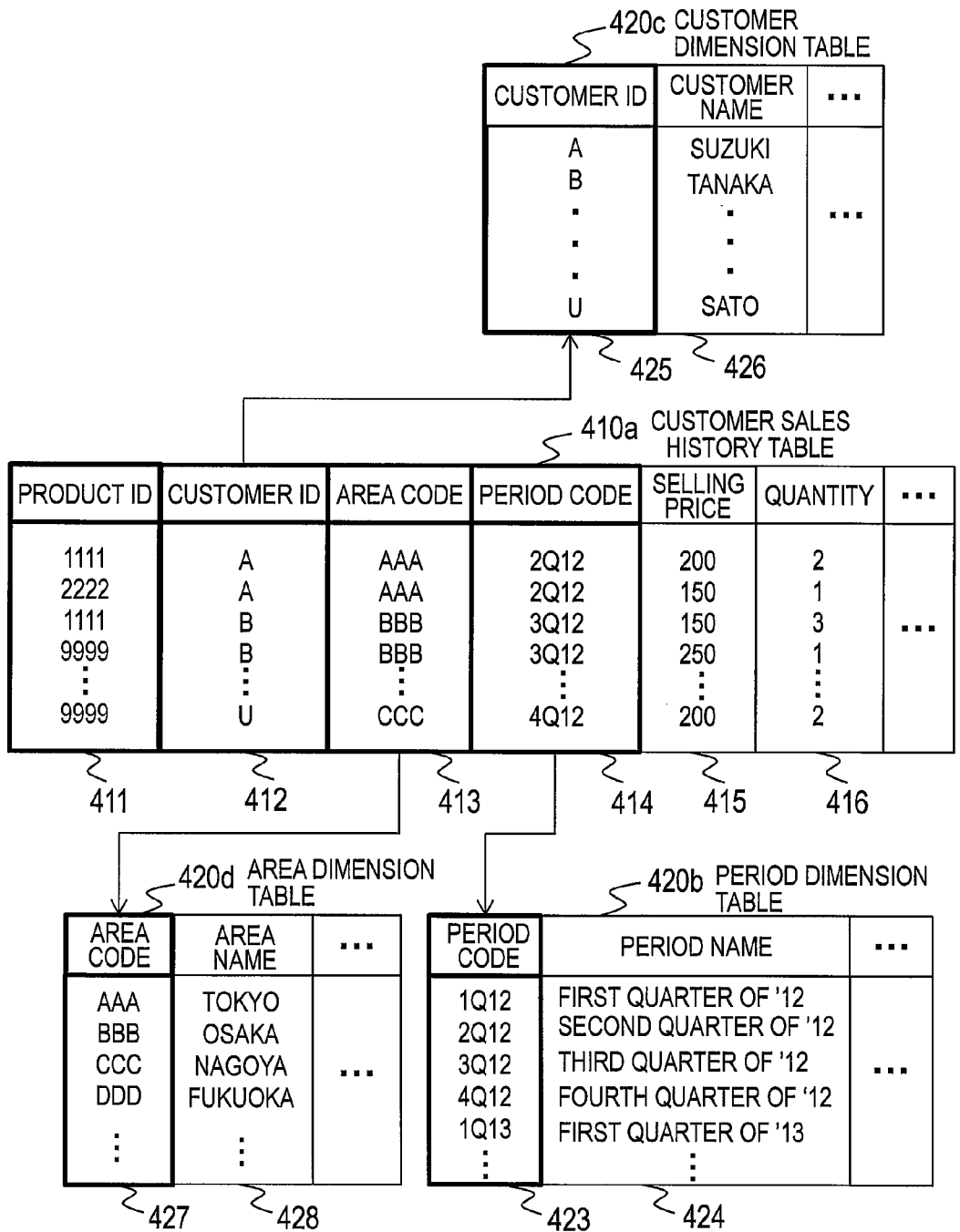
FIG. 13C is a diagram an example of a dimension table showing the query processing of the star schema according to the first embodiment of this invention.

Examples of the query processing of the star schema 400 are illustrated and shown in FIG. 13A, FIG. 13B, and FIG. 13C. FIG. 13A is an example of obtaining total sales ((selling price)×(quantity sold)) for each customer name 426 and each period name 424 with the area name 428 being "Tokyo".

In this example, in the query Q02, the analysis result is obtained from a cartesian product of the dimension tables 420b, 420c, and 420d of the star schema 400. In this example, in a case of obtaining the total sum of the selling price 415 for each customer name 426 with the area name 428 being "Tokyo" and the period name being the second quarter of 2012, the total sum of the selling price of the product purchased by the customer is obtained for each period code and each customer identifier 425 with the area code 427 being "AAA". The result of the query Q02 is output as a query result A02 of FIG. 13B.

Figure 14:
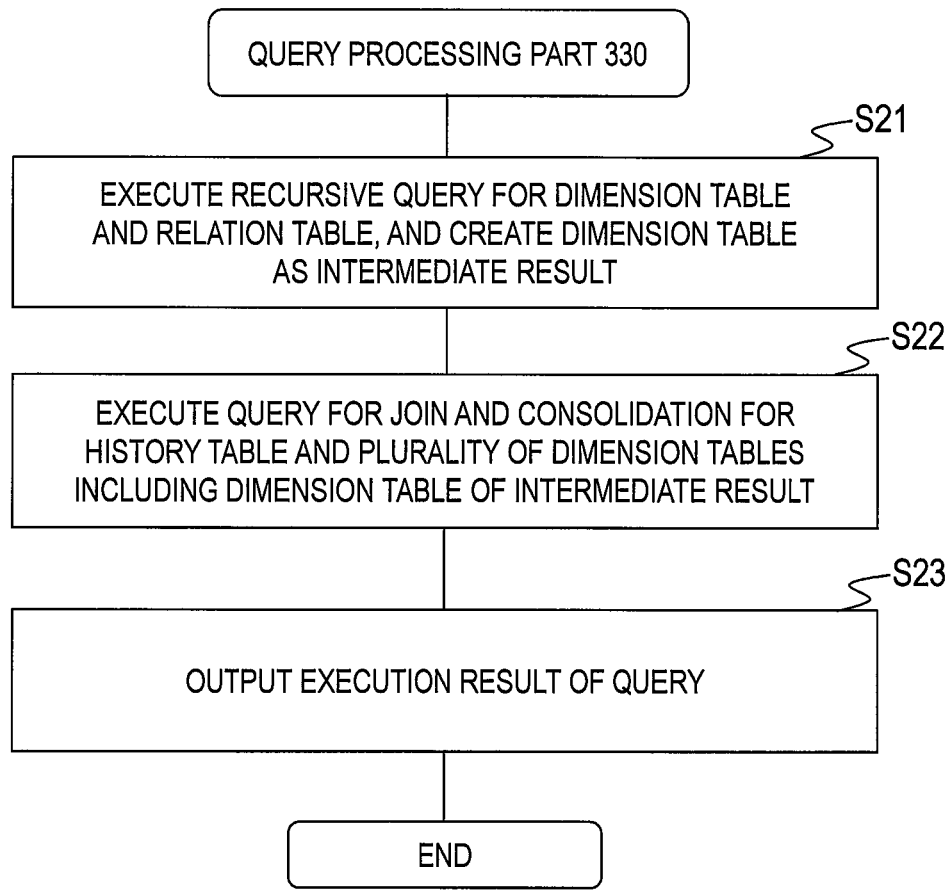
FIG. 14 is a flow chart illustrating an example of processing performed by the query processing part according to the first embodiment of this invention.

FIG. 14 is a flow chart illustrating an example of processing performed by the query processing part 330. This processing indicates an example of creating the second dimension table from the recursive query for a distance approximation property and a cluster property from the dimension table 420 and the customer relation table 500A, associating the fact table 410 with a plurality of dimension tables 420 including the created second dimension table, and obtaining a result from the query for join and consolidation.

First, the query processing part 330 executes such a recursive query as illustrated in FIG. 12 for the dimension table 420 and the relation table 500, and creates the second dimension table (for example, customer dimension table 420c' of FIG. 11) as an intermediate result (S21).

Subsequently, the query processing part 330 executes the query for the join and the consolidation for the customer sales history table 410a and a plurality of dimension tables 420 including the dimension table of the intermediate result (S22). Then, the query processing part 330 outputs the execution result (S23).

For example, in Step S21, as illustrated in FIG. 11, the query processing part 330 calculates the closeness centrality (centrality analysis) illustrated in FIG. 12 by the recursive query from the customer dimension table 420c and the customer relation table 500A that can form the graph structure 600', and calculates the second dimension table (customer dimension table) 420c' corresponding to the graph expression 600B as the customer having high centrality.

As a result, in the second dimension table 420c' of FIG. 11, with the customer identifier "A" as the center, the customer identifiers "B" to "D" within a short distance from the customer identifier "A" are extracted.

Subsequently, in Step S22, for example, as illustrated in FIG. 13A, when the total sum of the selling price for each customer name of the second dimension table 420c' is obtained for each period name, in Step S23, the total sum of the selling price for respective customer names of the customer identifiers "A" to "D" is output.

In this example, the query processing part 330 calculates the second dimension table 420c' from the customer relation table 500A and the customer dimension table 420c including a given group of customers from the received query, to thereby be able to quickly extract a purchase state and purchase trend of a product from the customer sales history table 410a in regard to the customer "A" having high centrality within the group of customers and the customers "B" to "D" within a close distance from the customer "A". By extracting the customer having high centrality from the group of customers who purchased the product based on the output of the above-mentioned query, it is possible to efficiently introduce and advertise a new product. For example, by introducing a given product to the customer "A", it is possible to allow the customer "A" to introduce a new product to the customers "B" to "D" within a close distance therefrom by word-of-mouth or the like.

Figure 15:
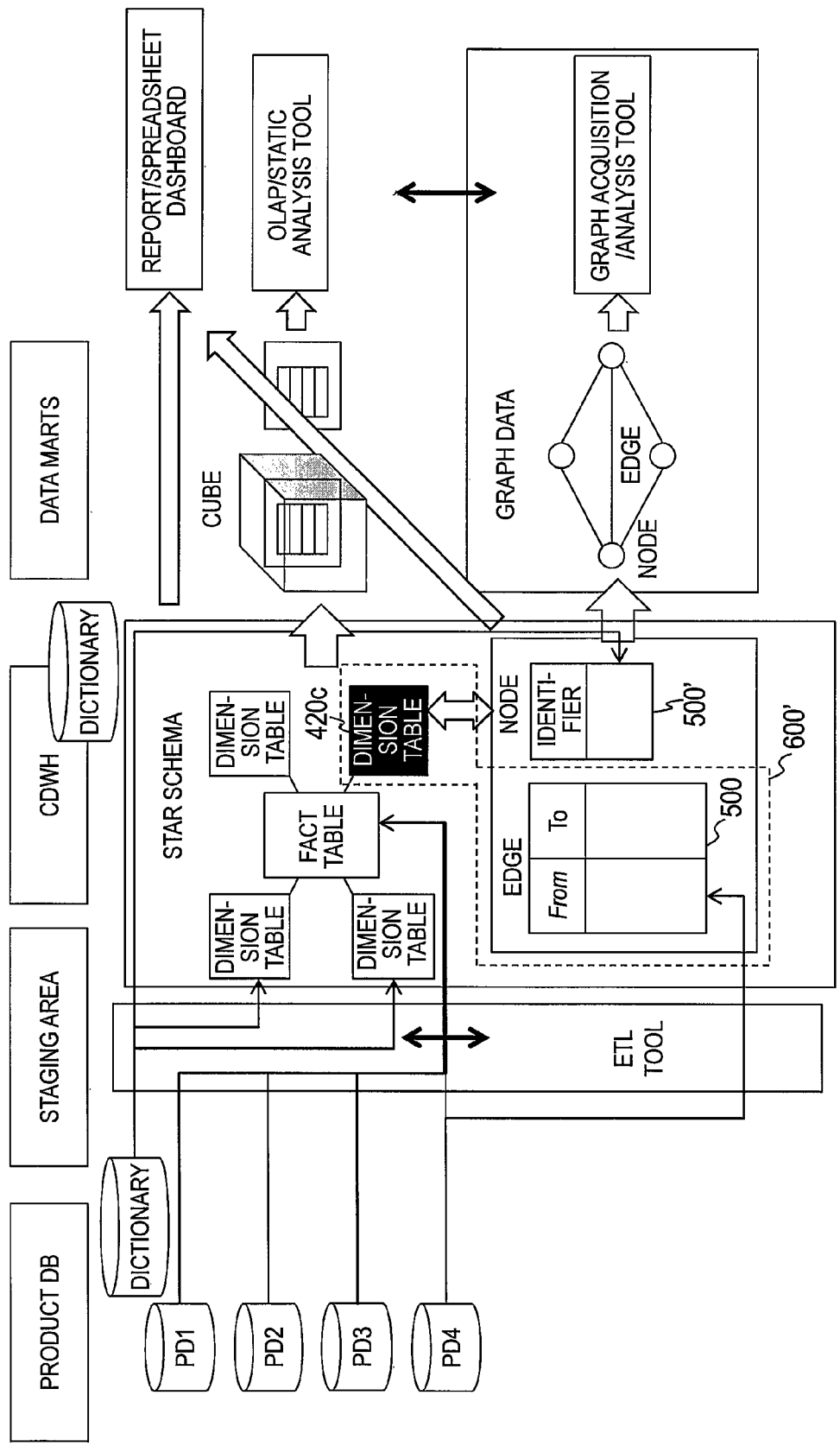
FIG. 15 illustrates an example of employing the graph data analysis apparatus 1 for a central data warehouse according to the first embodiment of this invention.

FIG. 15 illustrates an example of employing the graph data analysis apparatus 1 for a central data warehouse (CDWH). The graph data analysis apparatus 1 has the same configuration as in FIG. 1. In this example, the graph data analysis apparatus 1 is an extract, transform, and load (ETL) tool, and acquires the databases PD1 to PD4. Then, the query is executed to output the cube 700 and the graph data (such as partial graph). In regard to the output from the graph data analysis apparatus 1, an example of performing the analysis using the OLAP and the graph data analysis is illustrated. It should be noted that it suffices that the ETL tool is executed on an external computer, but the ETL tool may be executed on the graph data analysis apparatus 1.

As described above, in the first embodiment, by setting a part of the dimension table as a part of the graph structure 600', it is possible to prevent the data from being held duplicately, which allows reduction in the data amount. Further, as a result of performing the graph data analysis, the number of pieces of data within the dimension table is reduced, and in addition, data processing amounts of cartesian product computation and graph processing are reduced.

In particular, when the dimension table 420 based on which the fact table 410 is to be narrowed down can be expressed by the graph structure 600', the dimension table 420 can be quickly narrowed down by the graph data analysis, and hence the data amount of the manipulation target of the later OLAP is greatly reduced, which can reduce the time period necessary for the analysis.

Accordingly, when the dimension table 420 based on which the fact table 410 is to be narrowed down can be expressed by the graph structure 600', the fact table 410 can be quickly narrowed down by the graph data analysis, and hence the data amount of the manipulation target of the later OLAP is greatly reduced, which can reduce the time period necessary for the analysis.

Second Embodiment

As illustrated in FIG. 16 to FIG. 19B, in a second embodiment of this invention, the second dimension table is generated from the star schema 400 having a table structure, to output the graph data from the second dimension table, and the other configuration is the same as in the first embodiment.

In the second embodiment, the second dimension table (customer dimension table 420c') is generated from a plurality of dimension tables 420 and the fact table 410 (customer sales history table 410a) by the OLAP analysis or the like. Then, the graph data is output from the second dimension table (customer dimension table 420c').

Figure 16:
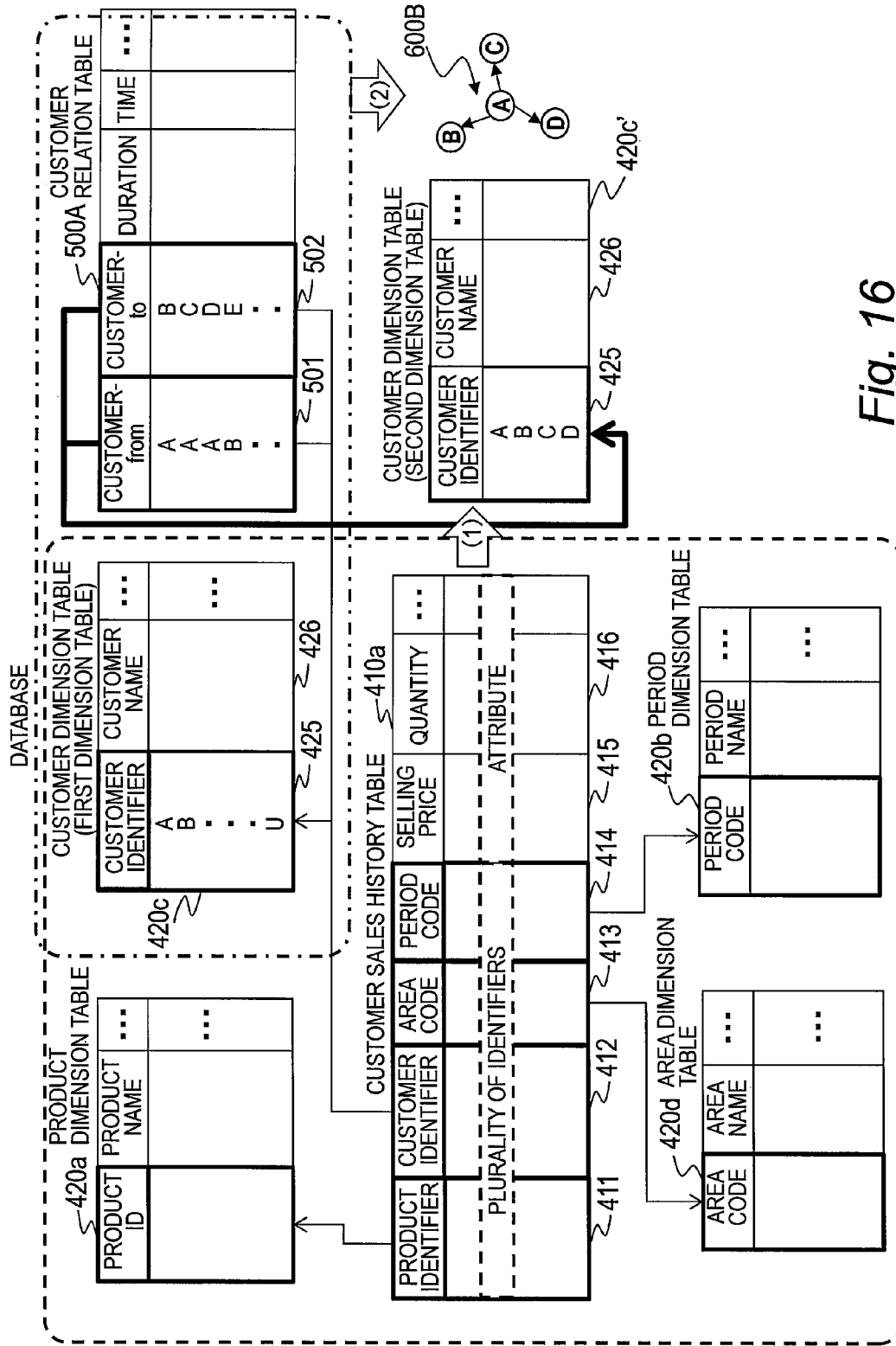
FIG. 16 is a diagram illustrating a relation between data at a time of generating the second dimension table from the star schema and then outputting the graph expression according to a second embodiment of this invention.

FIG. 16 is a diagram illustrating a relation between data at a time of generating the second dimension table (customer dimension table 420c') from the star schema 400 and then outputting the graph expression 600B.

In the second embodiment, as illustrated in FIG. 16, the customer identifier 412 for which the total sales ((selling price 415)×(quantity sold 416)) are maximum with the area name 428 being "Tokyo" is obtained (in FIG. 16, (1)). Then, the graph expression (partial graph) 600B of the customer relating to the customer identifier 412 is extracted by using the customer relation table 500A (in FIG. 16, (2)).

Figure 17:
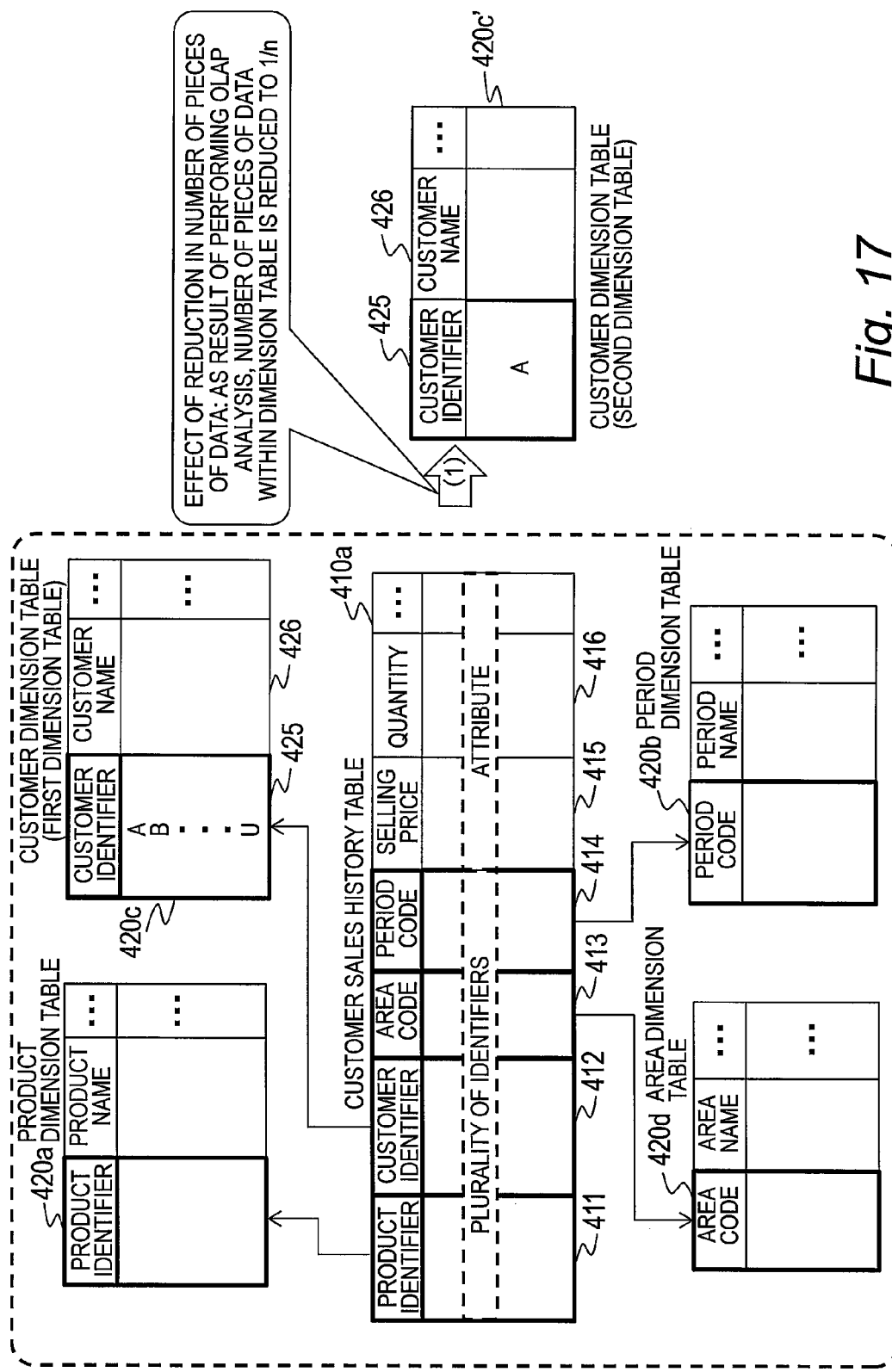
FIG. 17 is a diagram illustrating a relation between data at the time of generating the second dimension table from the star schema according to the second embodiment of this invention.

FIG. 17 is a diagram illustrating a relation between data at the time of generating the second dimension table from the star schema 400. The query processing part 330 of the graph data analysis apparatus 1 calculates the customer identifier 412 of "A" for which the total sales ((selling price 415)×(quantity sold 416)) are maximum with the area name 428 being "Tokyo" from the customer sales history table 410a and each dimension table 420. As a result, a table only for the customer identifier 425 of "A" is generated as the customer dimension table 420c' serving as the second dimension table.

FIG. 18 is a diagram illustrating an example of a query at the time of generating the second dimension table from the star schema 400.

As described above, the query processing part 330 reads a query Q03 to calculate the customer identifier 412 of "A" for which the total sales ((selling price 415)×(quantity sold 416)) are maximum with the area name 428 being "Tokyo" from the customer sales history table 410a and each dimension table 420, and to generate the customer dimension table 420c' serving as the second dimension table as described above.

Figures 19A, 19B:
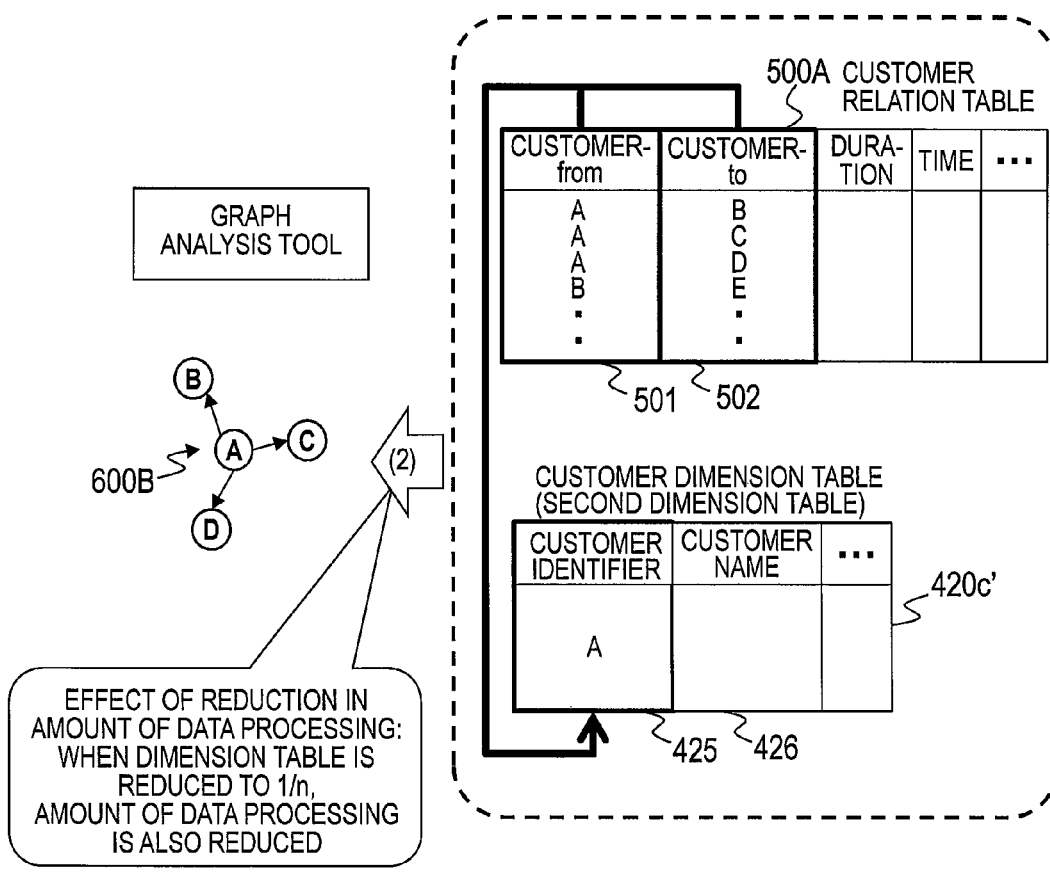
FIG. 19A is a diagram illustrating an example of a query performed when the graph expression is generated from the second dimension table according to the second embodiment of this invention.
FIG. 19B is a diagram illustrating a relation between data at the time of generating the graph expression from the second dimension table according to the second embodiment of this invention.

FIG. 19A is a diagram illustrating an example of a query performed when the graph expression 600B is generated from the second dimension table (customer dimension table 420c'). FIG. 19B is a diagram illustrating a relation between data at the time of generating the graph expression 600B from the second dimension table (customer dimension table 420c').

The query processing part 330 reads a query Q04 illustrated in FIG. 19A to extract the customer-to 502 relating to the second dimension table (customer dimension table 420c') from the customer relation table 500A. The customer-to 502 of the customer relation table 500A corresponding to the customer identifier 425 of "A" within the second dimension table 420c' is "B", "C", and "D", and hence the graph expression 600B is output.

As described above, also in the second embodiment, it is possible to reduce the data amount of the node for generating the graph data by the second dimension table. Further, in the same manner as in the first embodiment, by setting a part of the dimension table as a part of the graph structure, it is possible to prevent the data from being held duplicately, which allows reduction in the data amount. Further, as a result of analyzing the data having a table structure, the number of pieces of data within the dimension table is reduced, and the data amount of graph data processing is also reduced.

It should be noted that the configurations of the graph data analysis apparatus 1 and the like, the respective processing parts, processing means, and the like described in the embodiments of this invention may have a part thereof or an entirety thereof implemented by dedicated hardware.

Further, different kinds of software exemplified in this embodiment may be stored in different kinds of electromagnetic, electronic, and optical recording media (for example, non-transitory storage media), and can be downloaded onto a computer through a communication network such as the Internet.

Further, this invention is not limited to the above-mentioned embodiments, and various modification examples are included therein. For example, the above-mentioned embodiments are described in detail for a better understanding of this invention, and this invention is not necessarily limited to what includes all the configurations that have been described.

What is claimed is:

1. A data analysis method for analyzing data on a data analysis apparatus comprising a storage, comprising:
   a first step of setting, by the data analysis apparatus, a plurality of dimension tables each comprising a plurality of first identifier entries for identifying data to be analyzed and attributes corresponding to each first identifier;
   a second step of setting, by the data analysis apparatus, a history table comprising a plurality of second identifier entries respectively associated with each of the first identifiers of the plurality of dimension tables, and comprising attributes corresponding to each of the second identifiers, wherein the attributes and corresponding second identifiers are stored in a time series;
   a third step of setting, by the data analysis apparatus, a relation table comprising a first column and a second column, each of the first column and the second column having entries associated with an entry of the first identifiers of the dimension tables and comprising attributes corresponding to the entries of both the first column and the second column, the plurality of dimension tables comprising a first dimension table associated with first column and the second column of the relation table;
   a fourth step of associating, by the data analysis apparatus, each entry of the first column with each entry of the second column that refers to the first identifier of the first dimension table and combining the first dimension table and the relation table to be a graph structure by setting the first identifier of the first dimension table as a node and using the first column and the second column of the relation table indicating the correlation between the first column and the second column as an edge; and
   a fifth step of processing, by the data analysis apparatus, a query for the relation table and the first dimension table, and generating a second dimension table as a result of the processing of the query.

2. The data analysis method according to claim 1, further comprising a sixth step of executing, by the data analysis apparatus, a query in which the generated second dimension table, the plurality of dimension tables, and the history table relating thereto are associated with one another.

3. The data analysis method according to claim 1, wherein the fifth step comprises a seventh step of executing, by the data analysis apparatus, a query in which the plurality of dimension tables and the history table relating thereto are associated with each other, generating the second dimension table as a result of executing the query, and further comprising a seventh step of executing a query in which the generated second dimension table and the relation table are associated with each other.

4. The data analysis method according to claim 1, wherein the fifth step further comprises designating, by a query in which the relation table and the first dimension table are associated with each other, the attribute identified from the graph structure formed of the relation table and the first dimension table.

5. The data analysis method according to claim 2, wherein the sixth step comprises designating, by a query in which the second dimension table and the relation table are associated with each other, the attribute of the second dimension table.

6. The data analysis method according to claim 2, wherein the sixth step comprises designating, by a query in which the second dimension table, the plurality of dimension tables, and the history table relating thereto are associated with one another, the attribute and a range of a plurality of attribute values.

7. The data analysis method according to claim 3, wherein the seventh step comprises designating, by a query in which the second dimension table and the relation table are associated with each other, the attribute of the second dimension table.

8. The data analysis method according to claim 3, wherein the seventh step comprises designating, by a query in which the second dimension table, the plurality of dimension tables, and the history table relating thereto are associated with one another, the attribute and a range of a plurality of attribute values.

9. A data analysis apparatus for analyzing data, comprising:
   a processor;
   a storage;
   a table definition processing part configured to:
      set a plurality of dimension tables each comprising a plurality of first identifier entries for identifying data to be analyzed and attributes corresponding to each first identifier;
      set a history table comprising a plurality of second identifier entries respectively associated with each of the first identifier entries of the plurality of dimension tables, and comprising attributes corresponding to each of the second identifiers, wherein the attributes and corresponding second identifiers are stored in a time series;
      set a relation table including a first column and a second column, each of the first column and the second column having entries associated with an entry of the first identifiers of the dimension tables and comprising attributes corresponding to the entries of both the first column and the second column, the plurality of dimension tables comprising a first dimension table associated with the first column and the second column of the relation table; and
      associate each entry of the first column with each entry of the second column that refers to the first identifier of the first dimension table with the attributes and combining the first dimension table and the relation table to be a graph structure by setting the first identifier of the first dimension table as a node and using the first column and the second column of the relation table indicating the correlation between the first column and the second column as an edge;
   a data load part for capturing data into each of the plurality of dimension tables, the history table, and the relation table; and
   a query processing part for receiving a query, executing a query for the plurality of dimension tables, the history table, and the relation table, and generating a second dimension table as a result of executing the query.

10. The data analysis apparatus according to claim 9, wherein the query processing part executes a query in which the generated second dimension table, the plurality of dimension tables, and the history table relating thereto are associated with one another.

11. The data analysis apparatus according to claim 9, wherein the query processing part is configured to:

execute a query in which the plurality of dimension tables and the history table relating thereto are associated with each other;

generate the second dimension table as a result of executing the query; and execute a query in which the generated second dimension table and the relation table are associated with each other.

12. The data analysis apparatus according to claim 9, wherein the query processing part designates, by a query in which the relation table and the first dimension table are associated with each other, the attribute identified from the graph structure formed of the relation table and the first dimension table.

13. The data analysis apparatus according to claim 10, wherein the query processing part designates, by a query in which the second dimension table and the relation table are associated with each other, the attribute of the second dimension table.

14. The data analysis apparatus according to claim 10, wherein the query processing part designates, by a query in which the second dimension table, the plurality of dimension tables, and the history table relating thereto are associated with one another, the attribute and a range of a plurality of attribute values.

15. A non-transitory storage medium having stored thereon a processing program for controlling a computer comprising a processor and a storage to analyze data, the processing program controlling the computer to execute:

setting a plurality of dimension tables each comprising a plurality of first identifier entries for identifying data to be analyzed and attributes corresponding to each first identifier;

setting a history table comprising a plurality of second identifier entries respectively associated with each of the first identifiers of the plurality of dimension tables, and comprising attributes corresponding to each of the second identifiers, wherein the attributes and corresponding second identifiers are stored in a time series;

setting a relation table comprising a first column and a second column, each of the first column and the second column having entries associated with an entry of the first identifiers of the dimension tables and comprising attributes corresponding to the entries of both the first column and the second column, the plurality of dimension tables comprising a first dimension table associated with first column and the second column of the relation table;

associating each entry of the first column with each entry of the second column that refers to the first identifier of the first dimension table with the attributes and combining the first dimension table and the relation table to be a graph structure by setting the first identifier of the first dimension table as a node and using the first column and the second column of the relation table indicating the correlation between the first column and the second column as an edge; and performing processing based on a query for the relation table and the first dimension table, and generating a second dimension table as a result of the processing of the query.

16. The non-transitory storage medium having stored thereon a processing program according to claim 15, wherein the processing program further controls the computer to execute: executing a query in which the generated second dimension table, the plurality of dimension tables, and the history table relating thereto are associated with one another.

17. The non-transitory storage medium having stored thereon a processing program according to claim 15, wherein the processing program further controls the computer to execute: executing a query in which the plurality of dimension tables and the history table relating thereto are associated with each other, generating the second dimension table as a result of executing the query, and executing a query in which the generated second dimension table and the relation table are associated with each other.

18. The non-transitory storage medium having stored thereon a processing program according to claim 15, wherein the processing program further controls the computer to execute: designating, by a query in which the relation table and the first dimension table are associated with each other, the attribute identified from the graph structure formed of the relation table and the first dimension table.

19. The non-transitory storage medium having stored thereon a processing program according to claim 16, wherein the processing program further controls the computer to execute: designating, by a query in which the second dimension table and the relation table are associated with each other, the attribute of the second dimension table.

20. The non-transitory storage medium having stored thereon a processing program according to claim 16, wherein the processing program further controls the computer to execute: designating, by a query in which the second dimension table, the plurality of dimension tables, and the history table relating thereto are associated with one another, the attribute and a range of a plurality of attribute values.

* * * * *